(12) United States Patent  (10) Patent No.: US 8,126,950 B2
Huang et al.  (45) Date of Patent: *Feb. 28, 2012

(54) METHOD FOR PERFORMING A DOMAIN TRANSFORMATION OF A DIGITAL SIGNAL FROM THE TIME DOMAIN INTO THE FREQUENCY DOMAIN AND VICE VERSA

(75) Inventors: Haibin Huang, Singapore (SG); Xiao Lin, Singapore (SG); Susanto Rahardja, Singapore (SG); Rongshan Yu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 1335 days.

This patent is subject to a terminal disclaimer.

(21) Appl. No.: 10/573,953

(22) PCT Filed: May 6, 2004

(86) PCT No.: PCT/SG2004/000120
§ 371 (c)(1),
(2), (4) Date: May 3, 2007

(87) PCT Pub. No.: WO2005/031595
PCT Pub. Date: Apr. 7, 2005

(65) Prior Publication Data
US 2007/0276893 A1    Nov. 29, 2007

Related U.S. Application Data

(60) Provisional application No. 60/507,440, filed on Sep. 29, 2003, provisional application No. 60/507,210, filed on Sep. 29, 2003.

(51) Int. Cl.
*G06F 17/14*    (2006.01)

(52) U.S. Cl. ........................................................ 708/402
(58) Field of Classification Search ................... 708/402
See application file for complete search history.

(56) References Cited

U.S. PATENT DOCUMENTS 5,523,847 A    6/1996  Feig ............................ 358/261.3
(Continued)

FOREIGN PATENT DOCUMENTS
EP    1406179 A1    4/2004
(Continued)

OTHER PUBLICATIONS

Yonghong Zeng, et al., "Integer DCTs and Fast Algorithms", *IEEE Transactions on Signal Processing*, vol. 49, No. 11, Nov. 2001, pp. 2774-2782.

(Continued)

*Primary Examiner* — Tan V Mai
(74) *Attorney, Agent, or Firm* — Paul J. Backofen, Esq.; Crockett & Crockett, PC

(57) ABSTRACT

A method for performing a domain transformation of a digital signal from the time domain into the frequency domain and vice versa, the method including performing the transformation by a transforming element, the transformation element comprising a plurality of lifting stages, wherein the transformation corresponds to a transformation matrix and wherein at least one lifting stage of the plurality of lifting stages comprises at least one auxiliary transformation matrix and a rounding unit, the auxiliary transformation matrix comprising the transformation matrix itself or the corresponding transformation matrix of lower dimension. The method further comprising performing a rounding operation of the signal by the rounding unit after the transformation by the auxiliary transformation matrix.

15 Claims, 9 Drawing Sheets

U.S. PATENT DOCUMENTS

| | | | |
|---|---|---|---|
| 5,999,656 A | 12/1999 | Zandi | 382/248 |
| 7,512,539 B2* | 3/2009 | Geiger et al. | 704/500 |
| 2002/0012470 A1 | 1/2002 | Luna | 382/233 |
| 2003/0014136 A1 | 1/2003 | Wang | 700/94 |
| 2003/0088598 A1 | 5/2003 | Nakayama | |
| 2004/0184537 A1* | 9/2004 | Geiger et al. | 375/240.11 |

FOREIGN PATENT DOCUMENTS

| | | |
|---|---|---|
| GB | 2325368 A | 11/1998 |
| WO | WO 00/55757 | 9/2000 |

OTHER PUBLICATIONS

David Darlington, et al. "Digital Audio Effects in the Wavelet Domain", *Proc. of the 5th Int. Conference on Digital Audio Effects*, Hamburg Germany, Sep. 26-28, 2002.

Ingrid Daubechies and Wim Sweldens, "Factoring Wavelet Transforms Into Lifting Steps", *Tech, Report*, Bell Laboratories, Lucent Technologies, 1996.

Pengwei Hao and Qingyun Shi, "Matrix Factorizations for Reversible Integer Mapping", *IEEE Trans, Signal Processing*, vol. 49, No. 10, Oct. 2001, pp. 2314-2324.

Soontorn Oraintara, et al., "Integer Fast Fourier Transform", *IEEE Trans, Signal Processing*, vol. 50, No. 3, Mar. 2002, pp. 607-618.

Jia Wang, et al., "1-D and 2-D Transforms from Integers to Integers," *Proc. Int. Conf. Acoustics, Speech and Signal Processing*, Hong Kong, 2003, vol. II pp. 549-552.

Gerlind Plonka and Manfred Tasche "Invertible Integer DCT Algorithms", *Appl. Comput. Harmon. Anal.* 15:70-88, 2003.

Henrique S. Malvar, "Signal Processing with Lapped Transforms", *Artech House*, 1992.

Ralf Geiger, et al., "Audio Coding Based on Integer Transforms", *AES 111th Convention*, New York, USA, Sep. 2001, Convention Paper 5471.

Wang Zhongde, "On Computing the Discrete Fourier and Cosine Transforms", *IEEE Trans. on Acoustics, Speech and Signal Processing*, vol. ASSP-33, No. 4, Oct. 1985.

International Organization for Standardization; Coding of Moving Pictures and Audio, "Workplan for Evaluation of Integer MDCT for FGS to Lossless Experimentation Framework", ISO/IEC JTC 1/SC 29/WG 11 N5578, Pattaya, Thailand, Mar. 2003.

Geiger, et al., INTMDCT-A Link Between Perceptual and Lossless Audio Coding, 2 IEEE International Conference 1813 (IEEE 2002).

* cited by examiner

METHOD FOR PERFORMING A DOMAIN TRANSFORMATION OF A DIGITAL SIGNAL FROM THE TIME DOMAIN INTO THE FREQUENCY DOMAIN AND VICE VERSA

CROSS REFERENCE TO RELATED APPLICATIONS

This application claims the benefit of priority of U.S. Provisional Application No. 60/507,210, filed 29 Sep. 2003, and U.S. Provisional Application No. 60/507,440, filed 29 Sep. 2003, the contents of each being hereby incorporated by reference in its entirety for all purposes.

Further, the following commonly-owned applications are concurrently-filed herewith, and herein incorporated in its entirety:

"Method for Transforming a Digital Signal form the Time Domain into the Frequency Domain and Vice Versa," Ser. No. 10/573,953, and "Process and Device for Determining a Transforming Element for a Given Transformation Function, Method and Device for Transforming a Digital Signal from the Time Domain into the Frequency Domain and vice versa and Computer Readable Medium," Ser. No. 10/573,955.

BACKGROUND

This invention relates generally to digital signal processing, and in particular to systems and methods for performing domain transformations of digitally-formatted signals.

Domain transformations, for example the discrete cosine transform (DCT), are widely used in modern signal processing industry. Recently, a variant of the DCT, called integer DCT, has attracted a lot of re-search interests because of its important role in lossless coding applications. The term "lossless" means that the decoder can generate an exact copy of the source signal from the encoded bit-stream.

The DCT is a real-valued block transform. Even if the input block consists only of integers, the output block of the DCT can comprise non-integer components. For convenience, the input block is referred to as input vector and the output block as output vector. If a vector comprises only integer components, it is called an integer vector. In contrast to the DCT, the integer DCT generates an integer output vector from an integer input vector. For the same integer input vector, the integer output vector of integer DCT closely approximates the real output vector of DCT. Thus the integer DCT keeps all the good properties of the DCT in spectrum analysis.

An important property of the integer DCT is reversibility. Reversibility means that there exists an integer inverse DCT (IDCT) so that if the integer DCT generates an output vector y from an input vector x, the integer IDCT can recover the vector x from the vector y. Sometimes the integer DCT is also referred to as the forward transform, and the integer IDCT as the backward or inverse transform.

A transform called integer modified discrete cosine transform (IntMDCT) is recently proposed and used in the ISO/IEC MPEG-4 audio compression. The IntMDCT can be derived from its prototype—the modified discrete cosine transform (MDCT). The disclosure by H. S. Malvar in "Signal Processing with Lapped Transforms" *Artech House*, 1992 provides an efficient realization of MDCT by cascading a bank of Givens rotations with a DCT-IV block. It is well known that Givens rotation can be factorised into three lifting steps for mapping integers to integers. See e.g., R. Geiger, T. Sporer, J. Koller, K. Brandenburg, "Audio Coding based on Integer Transforms" AES 111th Convention, New York, USA, September 2001. Integer transforms can be directly converted from their prototypes by replacing each Givens rotation with three lifting steps. Because in each lifting step there is one rounding operation, the total rounding number of an integer transform is three times the Givens rotation number of the prototype transform. For discrete trigonometric transforms (for example the Discrete Fourier Transform (DFT) or the Discrete Cosine Transform (DCT)), the number of Givens rotations involved is usually at $N \log_2 N$ level, where N is the size of the blocks, i.e. the amount of data symbols included in each block, the digital signal is divided into. Accordingly, the total rounding number is also at $N \log_2 N$ level for the family of directly converted integer transforms. Because of the roundings, an integer transform only approximates its floating-point prototype. The approximation error increases with the number of roundings.

What is therefore needed is a method and system implementation for performing domain transformations using fewer rounding operations, thereby resulting in more accurate and less computationally intensive transformations.

SUMMARY OF THE INVENTION

The invention solves the problem of providing a method for performing a domain transformation of a digital signal from the time domain into the frequency domain and vice versa which comprises a significantly reduced number of rounding operations.

In one embodiment of the invention, a method for performing a domain transformation of a digital signal from the time domain into the frequency domain and vice versa includes performing the transformation by a transforming element which includes a plurality of lifting stages, wherein the transformation corresponds to a transformation matrix. At least one lifting stage includes at least one auxiliary transformation matrix, which is the transformation matrix itself or the respective transformation matrix of lower dimension. Further, each lifting stage includes a rounding unit. The method further includes processing the signal by the respective rounding unit after the transformation by the respective auxiliary transformation matrix.

In the technique as described below, a computer readable medium having a program recorded thereon is used, wherein the program is adapted to make a computer perform the method of the embodiments. The computer readable medium may be any data storage device that can store data as a program which can be thereafter read by a computer system. Examples of the computer readable medium include read-only memory, random access memory, CD-ROMs, magnetic tapes, floppy disks and optical data storage devices.

DETAILED DESCRIPTION OF SPECIFIC EMBODIMENTS

Figure 12:
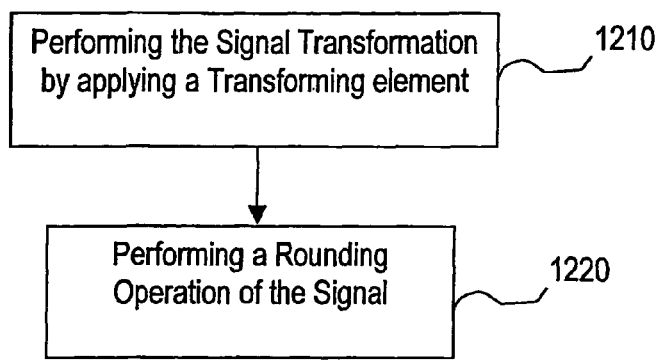
FIG. 12 illustrates a method for performing a domain transformation of a digital signal in accordance with one embodiment of the invention.

FIG. 12 illustrates a method for performing a domain transformation of a digital signal in accordance with one embodiment of the present invention. Initially at 1210, a transformation of the digital signal is performed by a transforming element comprising a plurality of lifting stages. The transformation corresponds to a transformation matrix wherein at least one of the lifting stages comprises an auxiliary transformation matrix and a rounding unit, the auxiliary matrix comprising the transformation matrix itself of the corresponding transformation matrix of lower dimension. Exemplary embodiments of the process 1210 and domain transformation which can be used in the domain transformation are further described below.

Next at 1220, a rounding operation of the signal is performed by the rounding unit after the transformation by the auxiliary matrix.

According to preferred embodiments of the method according to the invention, the data symbols of the digital signal are provided to the transforming element as a data vector. In each lifting stage, the data vector or a part of the data vector is transformed by a domain transformer, and the result of the transformation is rounded subsequently to an integer vector. This is in contrast to any method according to the state of the art, wherein the rounding process is performed within the transformation process for the individual element or data symbol in each block of the digital signal. Thus, the number of rounding operations in the method according to the invention is greatly reduced. Due to the reduced number of rounding operations, the method according to the invention does not require large computation time and computer resource. Further, the approximation error of integer domain transformations can be significantly reduced.

In a preferred embodiment, the invention provides a method for realizing the integer type-IV DCT transformation. The method according to the invention requires a significantly reduced number of rounding operations compared to prior art methods. As a result, the approximation error is greatly reduced, in the case of DCT-IV it can be reduced from the usual $N \log_2 N$ level to be as low as $1.5N$ in one embodiment and as low as $2.5N$ in another embodiment, where N denotes the block size of the digital signal. The method according to the invention is low in computational complexity and modular in structure.

The method and the device according to the invention can be used for any types of digital signals, such as audio, image or video signals. The digital signal, which is a digitised signal, corresponds to a physical measured signal, may be generated by scanning at least one characteristic feature of a corresponding analog signal (for example, the luminance and chrominance values of a video signal, the amplitude of an analog sound signal, or the analog sensing signal from a sensor). The digital signal comprises a plurality of data symbols. The data symbols of the digital signal are grouped into blocks, with each block having the same predefined number of data symbols based on the sampling rate of the corresponding analog signal.

The method according to the invention can be used for transforming an input digital signal which represents integer values to an output signal which also represents integer values. The transformation method according to the invention is reversible. The output signal may be transformed back to the original input signal by performing the transformation method according to the invention. Such a reversibility property of the transformation according to the method of the invention can be used in lossless coding in which the output signal should be identical to the original input signal.

Such an integer transformation of signals according to the invention can be used in many applications and systems such as MPEG audio, image and video compression, JPEG2000 or spectral analyzers (for analyzing Infrared, Ultra-violet or Nuclear Magnetic Radiation signals). It can also be easily implemented in hardware systems such as in a fixed-point Digital Signal Processor (DSP), without having to consider factors such as overflow in the case of a real-value signal transformation.

A preferred embodiment of the invention described below is suitable for both mono and stereo applications. In mono applications, two consecutive blocks of samples are grouped and processed together. This introduces signal delay of one block length when compared to single-block processing. However, in stereo applications, this extra block delay can be prevented, if simultaneous sample blocks from the left and the right channel are grouped and processed together.

According to the method according to the invention, the digital signal is transformed to the frequency domain by a transforming element.

Preferably, the transforming element comprises a plurality of lifting stages.

The transforming element can be illustrated based on the model of a lifting ladder. The lifting ladder model has two side pieces, each for receiving one of two groups of data symbols. Two or more cascading lifting stages are provided between the two side pieces. Each lifting stage receives a signal at one end (input end), and outputs a signal at the other end (output end) via a summation unit. A rounding unit is arranged at the output end. The lifting stages are arranged between the side pieces in an alternating manner, such that the output (or input) ends of adjacent lifting stages are connected to the different side pieces.

It should be noted that although the transforming element is described in the form of the lifting ladder model, it is only to illustrate the transformation paths of the transforming element. However, the invention shall not be limited to said ladder model.

Discrete cosine transforms, discrete sine transforms, discrete Fourier transforms or discrete W transforms are examples of transformations that may be performed by the method according to the invention.

In one aspect of the invention, each lifting stage corresponds to a lifting matrix which is a block-triangular matrix comprising four sub-matrices, with two invertible integer matrices in one diagonal. An example of a lifting matrix is:

$$\begin{bmatrix} P2_N & 0 \\ \underline{C_N^{IV}} & P1_N \end{bmatrix} \quad (1)$$

wherein $C_N^{IV}$ is the transformation function matrix, in this case the DCT-IV transformation matrix, and $P1_N$ and $P2_N$ are permutation matrices. A permutation matrix is a matrix which changes the position of the elements in another matrix. The permutation matrices may also be identical. The invertible integer matrices may also be arranged in the lifting matrix in another way, for example as $$\begin{bmatrix} 0 & P1_N \\ P2_N & \underline{C_N^{IV}} \end{bmatrix}. \quad (2)$$

Preferably, the invertible integer matrices are diagonal matrices which comprise only components which are one or minus one.

Figure 1:
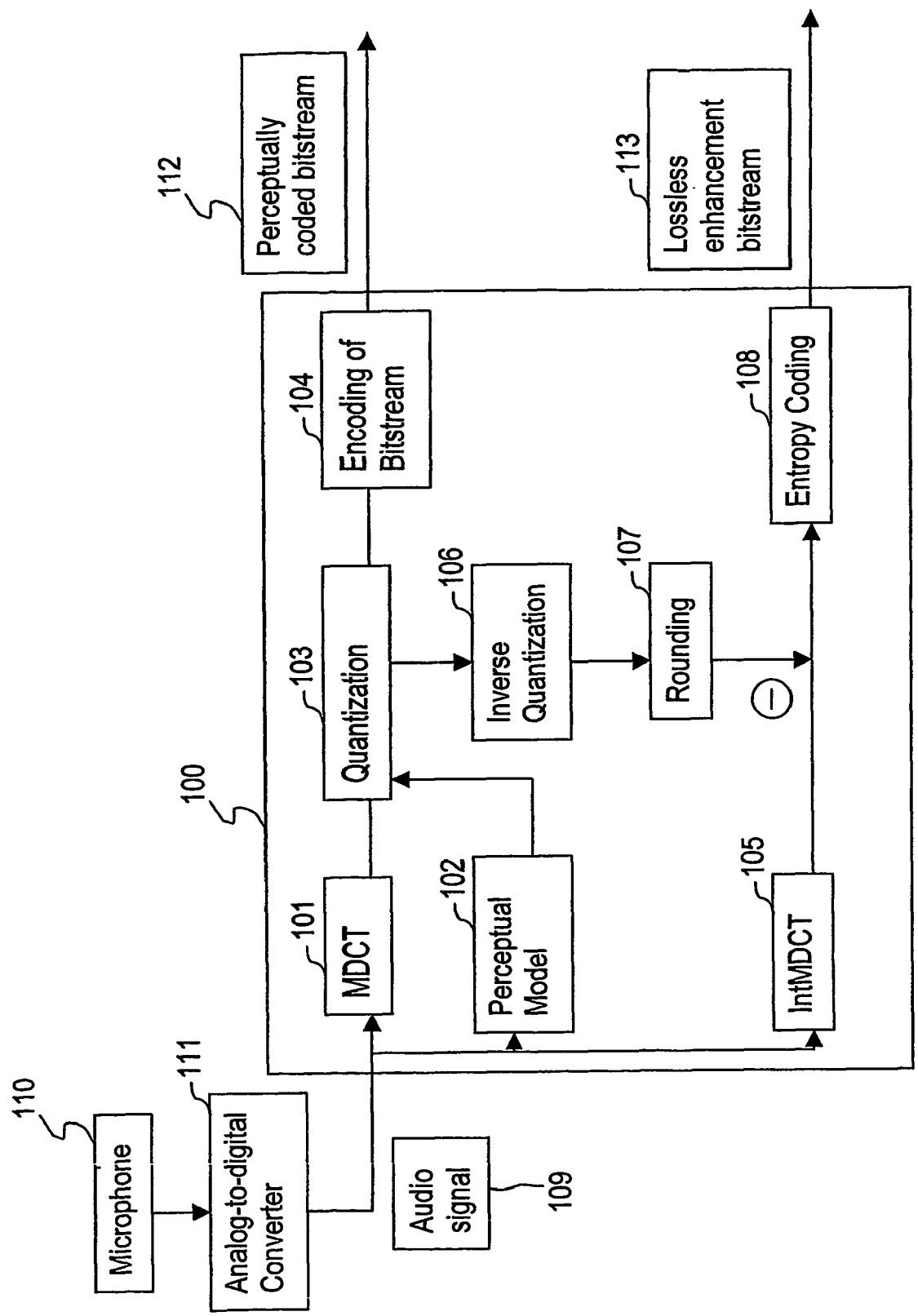
FIG. 1 shows the architecture of an audio encoder according to an embodiment of the invention.

FIG. 1 shows the architecture of an audio encoder 100 according to an embodiment of the invention. The audio encoder 100 comprises a conventional perceptual base layer coder based on the modified discrete cosine transform (MDCT) and a lossless enhancement coder based on the integer modified discrete cosine transform (IntMDCT).

An audio signal 109 which, for instance, is provided by a microphone 110 and which is digitalized by a analog-to-digital converter 111 is provided to the audio encoder 100. The audio signal 109 comprises a plurality of data symbols. The audio signal 109 is divided into a plurality of blocks, wherein each block comprises a plurality of data symbols of the digital signal and each block is transformed by a modified discrete cosine transform (MDCT) device 101. The MDCT coefficients are quantized by a quantizer 103 with the help of a perceptual model 102. The perceptual model controls the quantizer 103 in such a way that the audible distortions resulting from the quantization error are low. The quantized MDCT coefficients are subsequently encoded by a bitstream encoder 104 which produces the lossy perceptually coded output bitstream 112.

The bitstream encoder 104 losslessly compresses its input to produce an output which has a lower average bit-rate than its input by standard methods such as Huffman-Coding or Run-Length-Coding. The input audio signal 109 is also fed into an IntMDCT device 105 which produces IntMDCT coefficients. The quantized MDCT coefficients, which are the output of the quantizer 103, are used to predict the IntMDCT coefficients. The quantized MDCT coefficients are fed into an inverse quantizer 106 and the output (restored or non-quantized MDCT coefficients) is fed into a rounding unit 107.

The rounding unit rounds to an integer value MDCT coefficients, and the residual IntMDCT coefficients, which are the difference between the integer value MDCT and the IntMDCT coefficients, are entropy coded by an entropy coder 108. The entropy encoder, analogous to the bitstream encoder 104, losslessly reduces the average bit-rate of its input and produces a lossless enhancement bitstream 113. The lossless enhancement bit stream 113 together with the perceptually coded bitstream 112, carries the necessary information to reconstruct the input audio signal 109 with minimal error.

Figure 2:
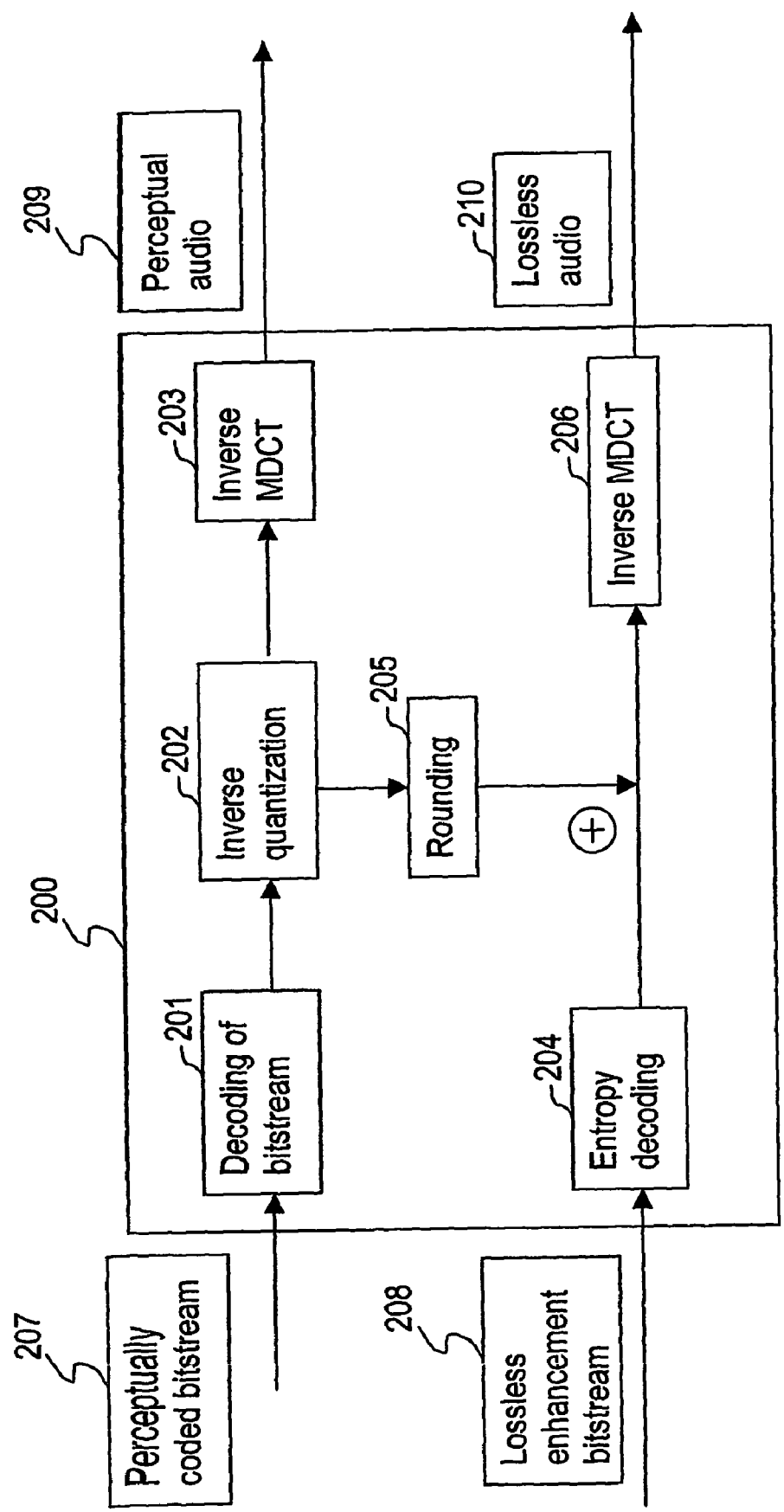
FIG. 2 shows the architecture of an audio decoder according to an embodiment of the invention, which corresponds to the audio coder shown in FIG. 1.

FIG. 2 shows the architecture of an audio decoder 200 comprising an embodiment of the invention, which corresponds to the audio coder 100 shown in FIG. 1. The perceptually coded bitstream 207 is supplied to a bitstream decoder 201, which performs the inverse operations to the operations of the bitstream encoder 104 of FIG. 1, producing a decoded bitstream. The decoded bitstream is supplied to an inverse quantizer 202, the output of which (restored MDCT coefficients) is supplied to the inverse MDCT device 203. Thus, the reconstructed perceptually coded audio signal 209 is obtained.

The lossless enhancement bitstream 208 is supplied to an entropy decoder 204, which performs the inverse operations to the operations of the entropy encoder 108 of FIG. 1 and which produces the corresponding residual IntMDCT coefficients. The output of the inverse quantizer 202 is rounded by a rounding device 205 to produce integer value MDCT coefficients. The integer value MDCT coefficients are added to the residual IntMDCT coefficients, thus producing the IntMDCT coefficients. Finally, the inverse IntMDCT is applied to the IntMDCT coefficients by an inverse IntMDCT device 206 to produce the reconstructed losslessly coded audio signal 210.

Figure 3:
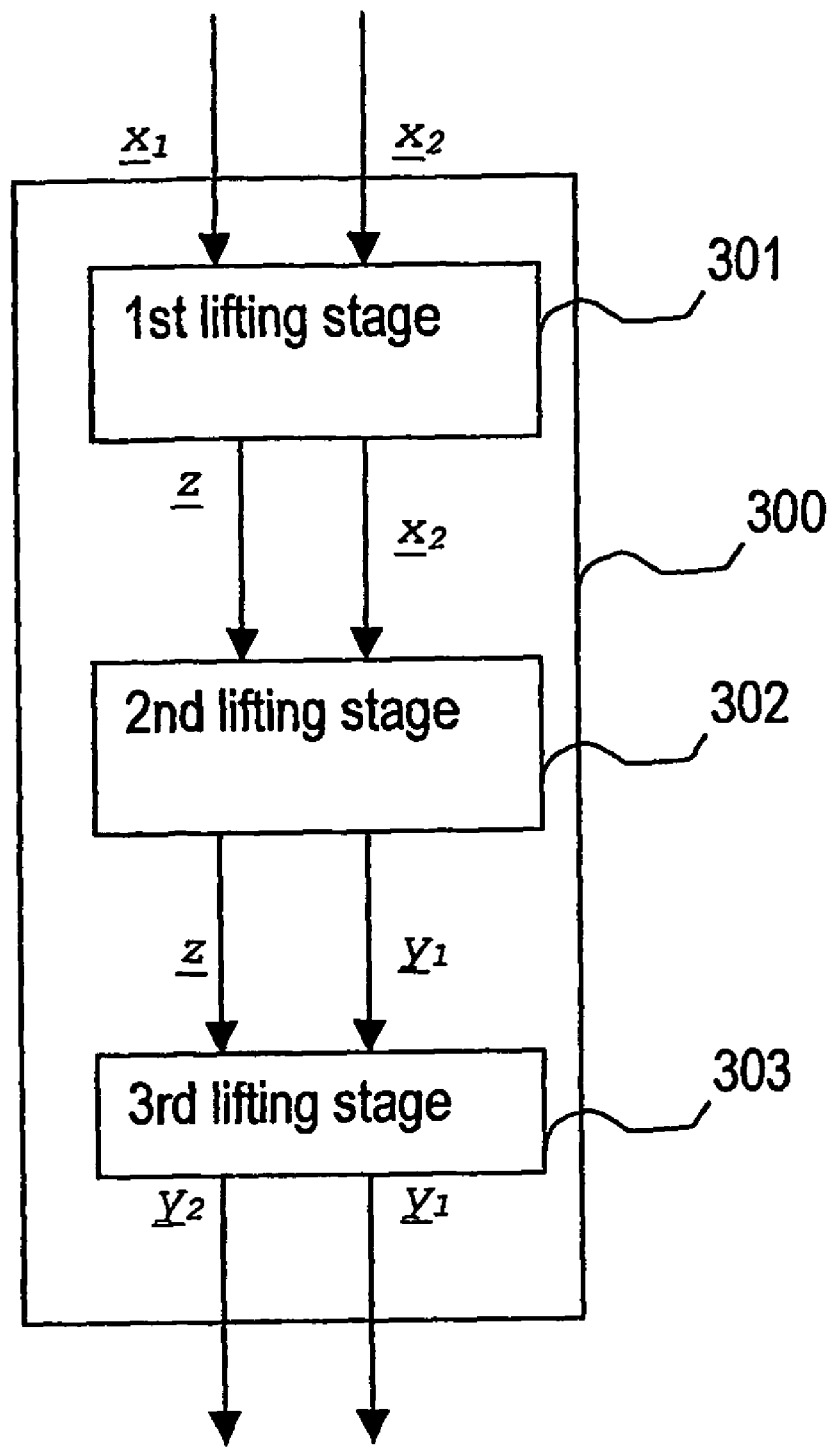
FIG. 3 shows a flow chart of an embodiment of the method according to the invention.

FIG. 3 shows a flow chart 300 of an embodiment of the method according to the invention using the DCT-IV as a transformation and using three lifting stages, a first lifting stage 301, a second lifting stage 302 and a third lifting stage 303. This method is preferably used in the IntMDCT device 105 of FIG. 1 and the inverse IntMDCT device 206 of FIG. 2 to implement IntMDCT and inverse IntMDCT, respectively. In FIG. 3, $x_1$ and $x_2$ are first and second blocks of the digital signal, respectively. z is an intermediate signal, and $y_1$ and $y_2$ are output signals corresponding to the first and second block of the digital signal, respectively.

As explained above, the DCT-IV-algorithm plays an important role in lossless audio coding.

The transformation function of the DCT-IV comprises the transformation matrix $C_N^{IV}$. According to this embodiment of the invention, the transforming element corresponds to a block-diagonal matrix comprising two blocks, wherein each block comprises the transformation matrix $C_N^{IV}$.

So, in this embodiment, the matrix corresponding to the transforming element is:

$$\begin{bmatrix} C_N^{IV} & \\ & \underline{C_N^{IV}} \end{bmatrix} \quad (3)$$

$C_N^{IV}$ shall in the context of this embodiment be referred to as the transformation matrix henceforth.

The number of lifting matrices, and hence the number of lifting stages in the transformation element, in this embodiment of the invention, wherein DCT-IV is the transformation function, is three.

The DCT-IV of an N-point real input sequence x(n) is defined as follows:

$$y(m) = \sqrt{\frac{2}{N}} \sum_{n=0}^{N-1} x(n) \cos\left(\frac{(m+1/2)(n+1/2)\pi}{N}\right), m, n = 0, 1, \cdots, N-1 \quad (4)$$

Let $C_N^{IV}$ be the transformation matrix of DCT-IV, that is $$C_N^{IV} = \sqrt{\frac{2}{N}} \left[\cos\left(\frac{(m+1/2)(n+1/2)\pi}{N}\right)\right]_{m,n=0,1,\cdots,N-1} \quad (5)$$

The following relation holds for the inverse DCT-IV matrix:

$$(C_N^{IV})^{-1} = C_N^{IV} \quad (6)$$

With $x = [x(n)]_{n=0, 1, \ldots, N-1}$ and $y = [y(m)]_{m=0, 1, \ldots, N-1}$, equation (4) can be expressed as $$y = C_N^{IV} x \quad (7)$$

Now, let $x_1$, $x_2$ be two integer N×1 column vectors. The column vectors $x_1$, $x_2$ correspond to two blocks of the digital signal which, according to the invention, are transformed by one transforming element. The DCT-IV transforms of $x_1$, $x_2$ are $y_1$, $y_2$, respectively.

$$y_1 = C_N^{IV} x_1 \quad (8)$$

$$y_2 = C_N^{IV} x_2 \quad (9)$$

Combining (8) and (9):

$$\begin{bmatrix} y_1 \\ y_2 \end{bmatrix} = \begin{bmatrix} C_N^{IV} & \\ & C_N^{IV} \end{bmatrix} \begin{bmatrix} x_1 \\ x_2 \end{bmatrix} \quad (10)$$

The above diagonal matrix is the block-diagonal matrix that the transforming element corresponds to.

It is within the scope of the invention if the above equation is changed by simple algebraic modifications like the one leading to $$\begin{bmatrix} y_1 \\ y_2 \end{bmatrix} = \begin{bmatrix} & C_N^{IV} \\ C_N^{IV} & \end{bmatrix} \begin{bmatrix} x_2 \\ x_1 \end{bmatrix} \quad (11)$$

Let $T_{2N}$ be the counter diagonal matrix in (11), that is $$T_{2N} = \begin{bmatrix} & C_N^{IV} \\ C_N^{IV} & \end{bmatrix} \quad (12)$$

The matrix $T_{2N}$ can be factorised as follows:

$$T_{2N} = \begin{bmatrix} & C_N^{IV} \\ C_N^{IV} & \end{bmatrix} = \begin{bmatrix} I_N & \\ -C_N^{IV} & I_N \end{bmatrix} \begin{bmatrix} -I_N & C_N^{IV} \\ & I_N \end{bmatrix} \begin{bmatrix} I_N & \\ C_N^{IV} & I_N \end{bmatrix} \quad (13)$$

where $I_N$ is the N×N identity matrix.

Equation (13) can be easily verified using the DCT-IV property in (7). Using (13), Equation (11) can be expressed as $$\begin{bmatrix} y_1 \\ y_2 \end{bmatrix} = \begin{bmatrix} I_N & \\ -C_N^{IV} & I_N \end{bmatrix} \begin{bmatrix} -I_N & C_N^{IV} \\ & I_N \end{bmatrix} \begin{bmatrix} I_N & \\ C_N^{IV} & I_N \end{bmatrix} \begin{bmatrix} x_2 \\ x_1 \end{bmatrix} \quad (14)$$

The three lifting matrices in equation (14) correspond to the three lifting stages shown in FIG. 3. Each lifting matrix in (14) comprises the auxiliary matrix $C_N^{IV}$, which is the transformation matrix itself.

From (14), the following integer DCT-IV algorithm that computes two integer DCT-IVs with one transforming element is derived.

Figure 4:
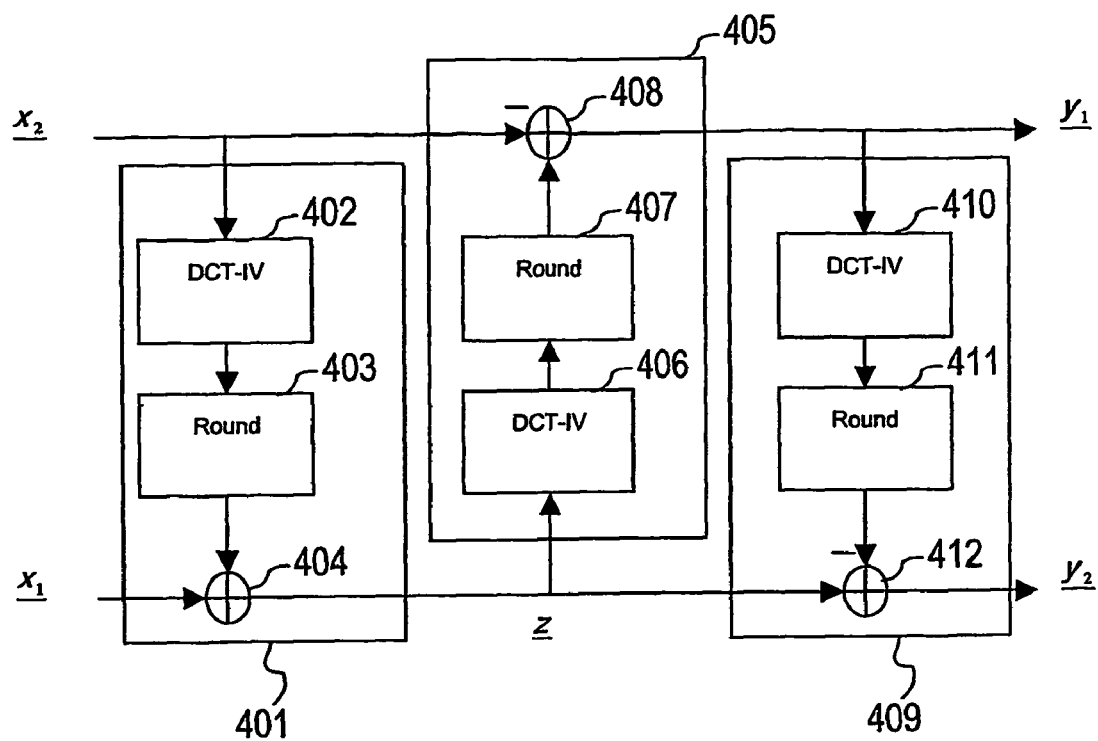
FIG. 4 illustrates an embodiment of the method according to the invention using DCT-IV as the transformation function.

FIG. 4 illustrates the embodiment of the method according to the invention using DCT-IV as the transformation function. This embodiment is used in the audio coder 100 shown in FIG. 1 for implementing IntMDCT. Like in FIG. 3, $x_1$ and $x_2$ are two blocks of the input digital signal, z is an intermediate signal, and $y_1$ and $y_2$ are corresponding blocks of the output signal.

The three lifting stages illustrated in FIG. 4 correspond to the three lifting matrices in equation (14).

As illustrated by FIG. 4, the time to frequency domain integer transform is determined by the following:

In the first stage 401, $x_2$ is transformed by a DCT-IV transformation 402 and the DCT-IV coefficients are rounded 403. The rounded DCT-IV coefficients are then added to $x_1$ 404. Thus, the intermediate signal z is generated. So, the intermediate signal z fulfils the equation:

$$z = \lfloor C_N^{IV} x_2 \rfloor + x_1 \quad (15a)$$

In the second stage 405, z is transformed by a DCT-IV transformation 406 and the DCT-IV coefficients are rounded 407. From the rounded DCT-IV coefficients $X_2$ is then subtracted. Thus, the output signal $y_1$ is generated. So, the output signal $y_1$ fulfils the equation:

$$y_1 = \lfloor C_N^{IV} z \rfloor - x_2 \quad (15b)$$

In the third stage 409, $y_1$ is transformed by a DCT-IV transformation 410 and the DCT-IV coefficients are rounded 411. The rounded DCT-IV coefficients are then subtracted from z. Thus, the output signal $y_2$ is generated. So, the output signal $y_2$ fulfils the equation:

$$y_2 = -\lfloor C_N^{IV} y_1 \rfloor + z \quad (15c)$$

where $\lfloor * \rfloor$ denotes rounding operation.

Figure 5:
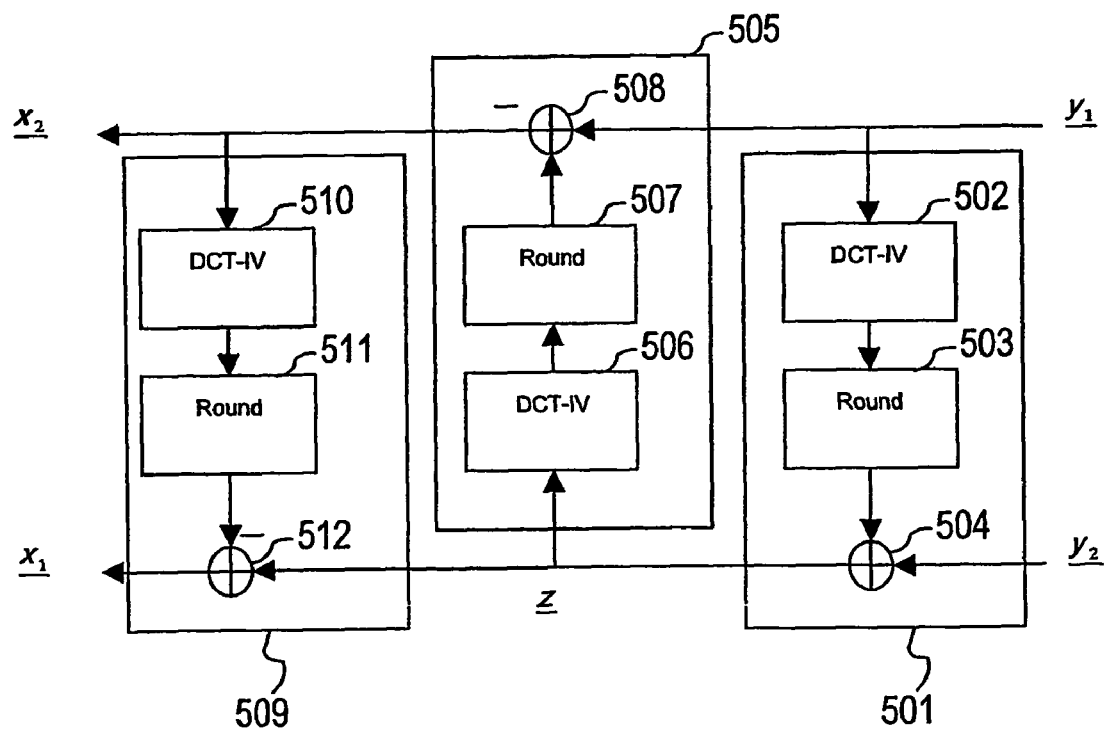
FIG. 5 illustrates the algorithm for the reverse transformation according to the embodiment of the method according to the invention illustrated in FIG. 4.

FIG. 5 illustrates the algorithm for the reverse transformation according to an embodiment of the method according to the invention using DCT-IV as the transformation function. This embodiment is used in the audio decoder 200 shown in FIG. 2 for implementing inverse IntMDCT. The algorithm illustrated in FIG. 5 is the inverse of the algorithm illustrated in FIG. 4. The denotations for the different signals $y_1$, $y_2$, $x_1$, $x_2$ and z are chosen corresponding to the denotations of FIG. 4.

As illustrated by FIG. 5, the frequency to time domain integer transform is determined by the following:

In the first stage 501, $y_1$ is transformed by a DCT-IV transformation 502 and the DCT-IV coefficients are rounded 503. The rounded DCT-IV coefficients are then added to $y_2$ 504. Thus, the intermediate signal z is generated. So, the intermediate signal z fulfils the equation:

$$z = \lfloor C_N^{IV} y_1 \rfloor + y_2 \quad (16a)$$

In the second stage 505, z is transformed by a DCT-IV transformation 506 and the DCT-IV coefficients are rounded 507. From the rounded DCT-IV coefficients $y_1$ is then subtracted. Thus, the signal $x_2$ is generated. So, the signal $x_2$ fulfils the equation:

$$x_2 = \lfloor C_N^{IV} z \rfloor - y_1 \qquad (16b)$$

In the third stage 509, $x_2$ is transformed by a DCT-IV transformation 510 and the DCT-IV coefficients are rounded 511. The rounded DCT-IV coefficients are then subtracted from z. Thus, the signal $x_1$ is generated. So, the signal $x_1$ fulfils the equation:

$$x_1 = -\lfloor C_N^{IV} x_2 \rfloor + z \qquad (16c)$$

It can be seen that the algorithm according to the equations (16a) to (16c) is inverse to the algorithm according to the equations (15a) to (15c). Thus, if used in the encoder and decoder illustrated in FIGS. 1 and 2, the algorithms provide a method and an apparatus for lossless audio coding.

The equations (15a) to (15c) and (16a) to (16c) further show that to compute two N×N integer DCT-IVs, three N×N DCT-IVs, three N×1 roundings, and three N×1 additions are needed. Therefore, for one N×N integer DCT-IV, the average is:

$$RC(N) = 1.5N \qquad (17)$$

$$AC(N) = 1.5AC(C_N^{IV}) + 1.5N \qquad (18)$$

where RC(.) is the total rounding number, and AC(.) is the total number of arithmetic operations. Compared to the directly converted integer DCT-IV algorithms, the proposed integer DCT-IV algorithm reduces RC from level $N \log_2 N$ to N.

As indicated by (18), the arithmetic complexity of the proposed integer DCT-IV algorithm is about 50 percent more than that of a DCT-IV algorithm. However, if RC is also considered, the combined complexity (AC+RC) of the proposed algorithm does not much exceed that of the directly converted integer algorithms. Exact analysis of the algorithm complexity depends on the DCT-IV algorithm used.

As shown in FIGS. 4 and 5, the proposed integer DCT-IV algorithm is simple and modular in structure. It can use any existing DCT-IV algorithms in its DCT-IV computation block. The proposed algorithm is suitable for applications that require IntMDCT, e.g. in the MPEG-4 audio extension 3 reference model 0.

Figure 6:
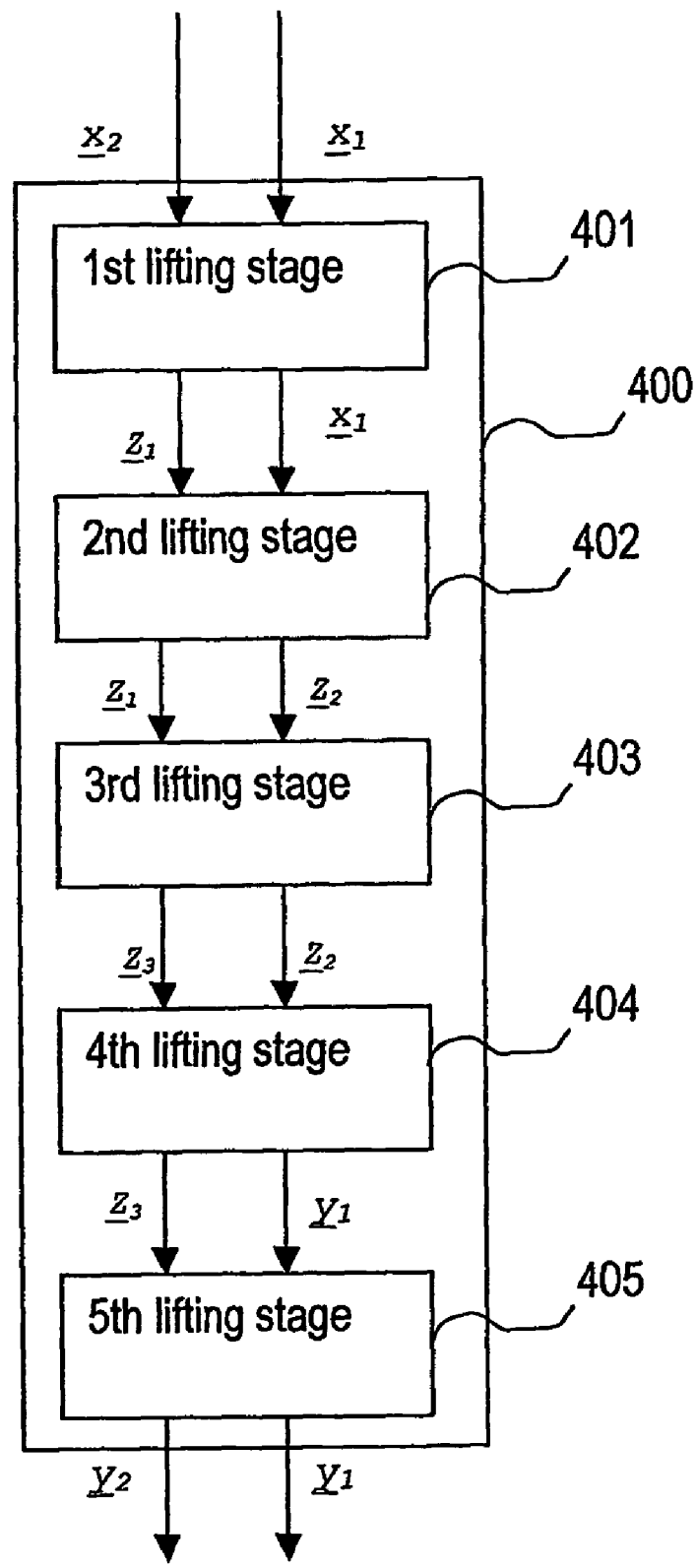
FIG. 6 shows a flow chart of an embodiment of the method according to the invention.

FIG. 6 shows a flow chart 600 of an embodiment of the method according to the invention using five lifting stages, a first lifting stage 601, a second lifting stage 602, a third lifting stage 603, a fourth lifting stage 604 and a fifth lifting stage 605. This method can be used in the IntMDCT device 105 of FIG. 1 and the inverse IntMDCT device 206 of FIG. 2 to implement IntMDCT and inverse IntMDCT, respectively. In FIG. 6, $x_1$ and $x_2$ are first and second blocks of the digital signal, respectively. $z_1, z_2, z_3$ are intermediate signals, and $y_1$ and $y_2$ are output signals corresponding to the first and second block of the digital signal, respectively.

Figure 7:
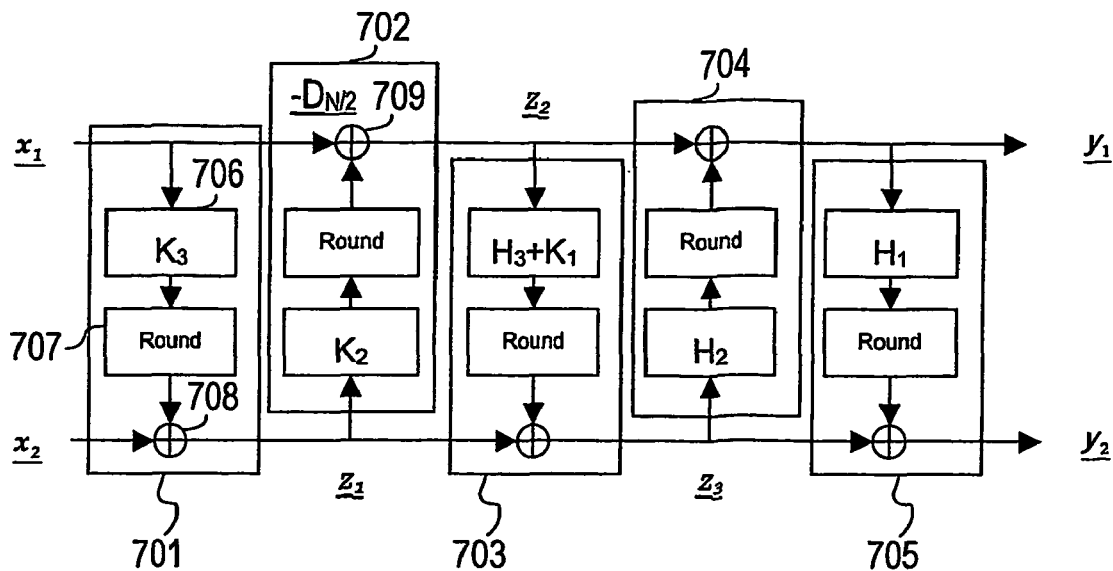
FIG. 7 illustrates an embodiment of the method according to the invention using DCT-IV as the transformation function.

FIG. 7 shows a flow chart of an embodiment of the method according to the invention, wherein the transformation function is a DCT-IV transformation function.

The DCT-IV matrix $C_N^{IV}$ (see equation (5)) can be factorised as $$C_N^{IV} = R_{po} T P_{eo} \qquad (20)$$

where $P_{eo}$ is an even-odd matrix, i.e., a permutation matrix reordering the components of the vector $$\underline{x} = \begin{bmatrix} x(0) \\ \vdots \\ x(N-1) \end{bmatrix}$$

by separating the components which correspond to even indices from the components which correspond to odd indices, i.e., such that $$\begin{bmatrix} x_1(0) \\ \vdots \\ x_1\left(\frac{N}{2}-1\right) \\ x_2(0) \\ \vdots \\ x_2\left(\frac{N}{2}-1\right) \end{bmatrix} = \underline{P_{eo}} \begin{bmatrix} x(0) \\ \vdots \\ x(N-1) \end{bmatrix} \qquad (21)$$

where further $$\underline{T} = \underline{T_1 T_2 T_3} = \begin{bmatrix} I_{N/2} & \\ \underline{K_1} & I_{N/2} \end{bmatrix} \cdot \begin{bmatrix} -D_{N/2} & \underline{K_2} \\ & I_{N/2} \end{bmatrix} \cdot \begin{bmatrix} I_{N/2} & \\ \underline{K_3} & I_{N/2} \end{bmatrix} \qquad (22)$$

with $$\underline{K_1} = -(C_{N/2}^{IV} D_{N/2} + \sqrt{2}\, I_{N/2}) C_{N/2}^{IV} \qquad (23)$$

$$\underline{K_2} = \frac{C_{N/2}^{IV}}{\sqrt{2}} \qquad (24)$$

$$\underline{K_3} = \sqrt{2}\, C_{N/2}^{IV} D_{N/2} + I_{N/2} \qquad (25)$$

and $$\underline{R_{po}} = \underline{R_1 R_2 R_3} = \begin{bmatrix} I_{N/2} & \\ \underline{H_1} & I_{N/2} \end{bmatrix} \cdot \begin{bmatrix} I_{N/2} & \underline{H_2} \\ & I_{N/2} \end{bmatrix} \cdot \begin{bmatrix} I_{N/2} & \\ \underline{H_3} & I_{N/2} \end{bmatrix} \qquad (26)$$

$$\underline{H_1} = \underline{H_3} = \begin{bmatrix} & & & -\tan\frac{(N-1)\pi}{8N} \\ & & \cdot^{\cdot^{\cdot}} & \\ & -\tan\frac{3\pi}{8N} & & \\ -\tan\frac{\pi}{8N} & & & \end{bmatrix} \qquad (27)$$

and $$\underline{H_2} = \begin{bmatrix} & & & \sin\frac{\pi}{4N} \\ & & \sin\frac{3\pi}{4N} & \\ & \cdot^{\cdot^{\cdot}} & & \\ \sin\frac{(N-1)\pi}{4N} & & & \end{bmatrix} \qquad (28)$$

Equation (20) can be further written as $$\underline{C_N^{IV}} = \underline{R_1 R_2 S\ T_2 T_3 P_{eo}} \quad (29)$$

where $$\underline{S} = \underline{R_3 T_1} = \begin{bmatrix} I_{N/2} & \\ \underline{H_3} + \underline{K_1} & I_{N/2} \end{bmatrix} \quad (30)$$

The transforming element used in the embodiment illustrated in FIG. 7 corresponds to the equation (29). Each lifting matrix $S$, $T_2$ and $T_3$ in (29) comprises the auxiliary matrix $C_{N/2}^{IV}$, which is the transformation matrix itself.

The transforming element comprises five lifting stages which correspond to the five lifting matrices of equation (29).

Further, the transforming element comprises a data shuffling stage corresponding to the permutation matrix $P_{eo}$.

In FIG. 7, the input of the first lifting stage are the two blocks of the digital signal $x_1$ and $x_2$, $z_1$, $Z_2$ and $z_3$ are intermediate signals and $y_1$ and $y_2$ are output signals corresponding to the first and second block of the digital signal, respectively.

The input of the transforming element x and the two input blocks of the first lifting stage of the transforming element $x_1$ and $x_2$ fulfil the equation $$\begin{bmatrix} x_1 \\ x_2 \end{bmatrix} = \underline{P_{eo}} x \quad (31)$$

In the following, the first lifting stage 701 is explained, which is the lifting stage corresponding to the lifting matrix $T_3$.

Let $$\begin{bmatrix} v_1 \\ v_2 \end{bmatrix}$$

be the output vector of the first lifting stage, for the time being without rounding to integer values, i.e.

$$\begin{bmatrix} v_1 \\ v_2 \end{bmatrix} = \underline{T_3} \begin{bmatrix} x_1 \\ x_2 \end{bmatrix} \quad (32)$$

Using the definition of $T_3$ provided by equation (22), equation (29) is re-written as $$\begin{bmatrix} v_1 \\ v_2 \end{bmatrix} = \begin{bmatrix} I_{\frac{N}{2}} & \\ \underline{K_3} & I_{\frac{N}{2}} \end{bmatrix} \begin{bmatrix} x_1 \\ x_2 \end{bmatrix} \quad (33)$$

where $$I_{\frac{N}{2}}$$

denotes the identity matrix of dimension N/2.

Since in this embodiment, a reversible algorithm for integer DCT-IV in this provided, there is included a rounding to integer values. So, according to equation (30), in the first step 706 of the first lifting stage 701, $x_1$ is multiplied by $K_3$. The result of this multiplication is rounded to integer values in step 707. The rounded values are then added to $x_2$ in step 708. Thus, the intermediate signal $z_1$ fulfils the equation $$z_1 = \lfloor K_3 \cdot x_1 \rfloor + x_2 \quad (34)$$

where $\lfloor * \rfloor$ denotes rounding operation.

Since the other four lifting stages 702, 703, 704, 705 of the transforming element illustrated in FIG. 7, which correspond to the matrices $T_2$, S, $R_2$ and $R_1$ respectively, have identical structures as the first lifting stage 701, their explanation is omitted. It only has to be noted that in the adding step 709 of the second lifting step 702, $x_1$ is, according to the definition of $T_2$, multiplied with $-D_{N/2}$.

In the following, the lifting stages of the transforming element of the reverse transformation are explained with reference to FIG. 8.

Figure 8:
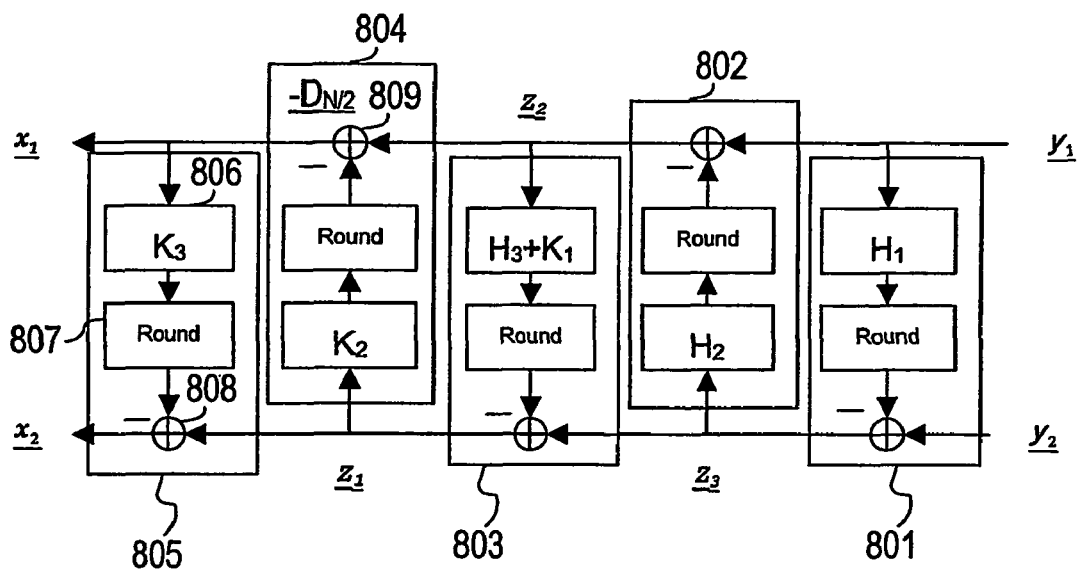
FIG. 8 illustrates the algorithm for the reverse transformation according to the embodiment of the method according to the invention illustrated in FIG. 7.

FIG. 8 illustrates the lifting stages of the transforming element for the reverse transformation of the transformation illustrated in FIG. 7.

In FIG. 8, the input of the first lifting stage are the two blocks of the digital signal $y_1$ and $y_2$, $z_1$, $Z_2$ and $z_3$ are intermediate signals and $x_1$ and $x_2$ are output signals corresponding to the first and second block of the digital signal, respectively.

The last lifting stage 805 illustrated in FIG. 8 is inverse to the first lifting stage 701 illustrated in FIG. 7. So, in the first step 806 of the last lifting stage 805, $x_1$ is multiplied by $K_3$. The result of this multiplication is rounded to integer values in step 807. The rounded values are then subtracted from $z_1$ in step 808. Thus, the signal $x_2$ fulfils the equation $$x_2 = z_1 - \lfloor K_3 \cdot x_1 \rfloor \quad (35)$$

where $\lfloor * \rfloor$ denotes rounding operation.

Since the other four lifting stages 801, 802, 803, 804 of the transforming element illustrated in FIG. 8, which are inverse to the lifting stages 705, 704, 703 and 702 of the transforming element illustrated in FIG. 7 respectively, have identical structures as the last lifting stage 805, their explanation is omitted. It only has to be noted that after-the-adding step 809 of the fourth lifting step 804, the result of the adding step 809 is multiplied with $-D_{N/2}$ to produce $x_1$.

It can be seen that the lifting stages 805, 804, 803, 802 and 801 of FIG. 8 are inverse to the lifting stages 701 to 705 of FIG. 7, respectively. Since also the permutation of the input signal corresponding to the matrix $P_{eo}$ can be reversed and an according data shuffling stage is comprised by the inverse transforming element, the provided method is reversible, thus, if used in the audio encoder 100 and the audio decoder 200 illustrated in FIGS. 1 and 2, providing a method and an apparatus for lossless audio coding.

An analysis of the number of roundings used in this embodiment is given at the end of the description of the invention.

Figure 9:
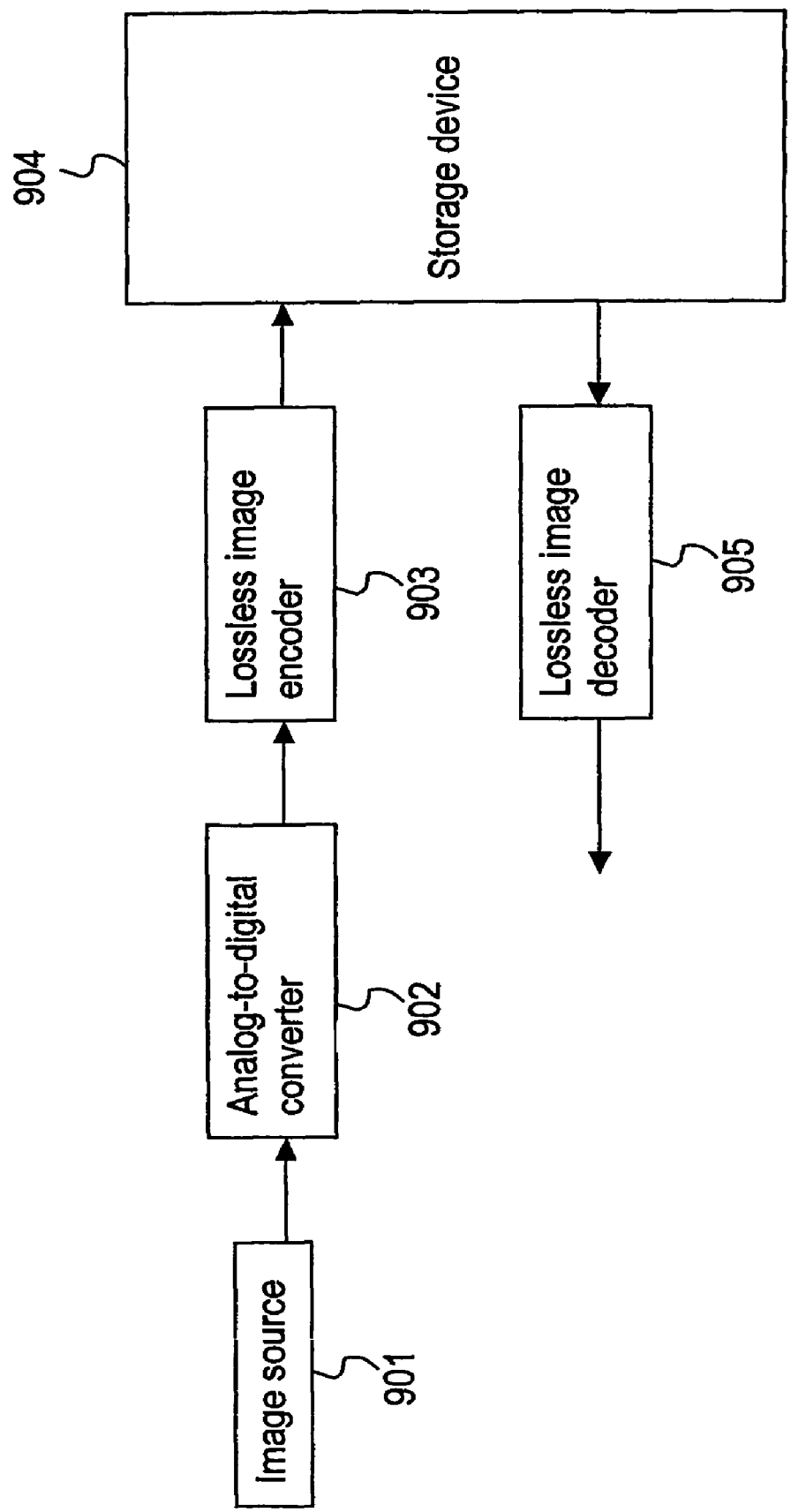
FIG. 9 shows the architecture for an image archiving system according to an embodiment of the invention.

FIG. 9 shows the architecture for an image archiving system according to an embodiment of the invention.

In FIG. 9 an image source 901, for instance a camera, provides an analog image signal. The image signal is processed by a analog-to-digital converter 902 to provide a corresponding digital image signal. The digital image signal is losslessy encoded by a lossless image encoder 903 which includes a transformation from the time domain to the frequency domain. In this embodiment, the time domain corresponds to the coordinate space of the image. The lossless coded image signal is stored in a storage device 904, for example a hard disk or a DVD. When the image is needed, the losslessly coded image signal is fetched from the storage device 904 and provided to a lossless image decoder 905 which decodes the losslessly coded image signal and reconstructs the original image signal without any data loss.

Such lossless archiving of image signals is important, for example, in the case that the images are error maps of semiconductor wafers and have to be stored for later analysis.

In the following, a further embodiment of the method for the transformation of a digital signal from the time domain to the frequency domain and vice versa according to the invention is explained. This embodiment is preferably used in the lossless image encoder 903 and the lossless image decoder 905 of the image archiving system illustrated in FIG. 9.

Figure 10:
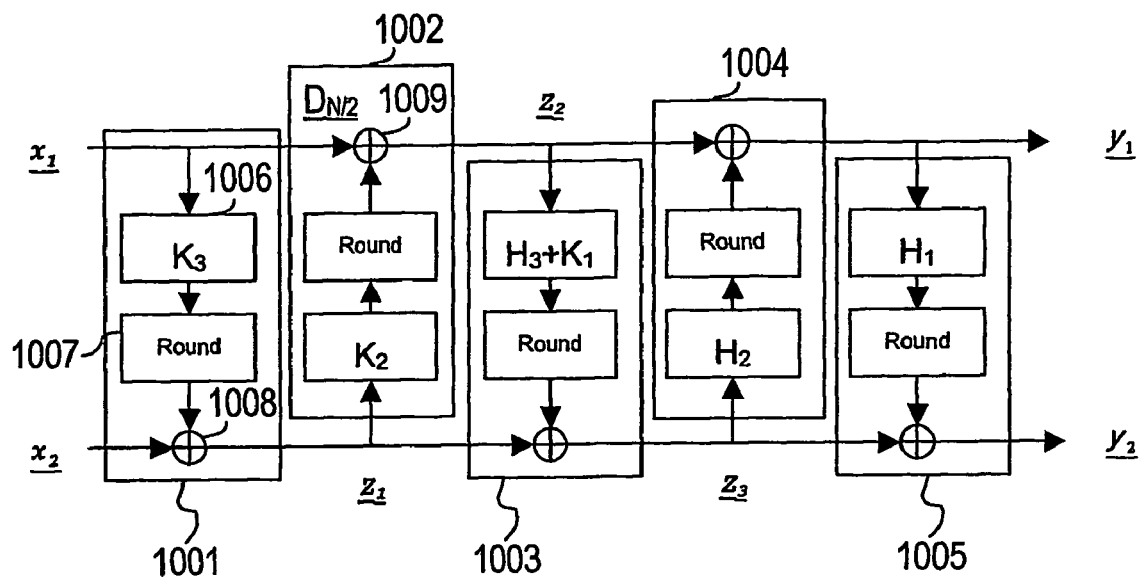
FIG. 10 illustrates an embodiment of the method according to the invention using DWT-IV as the transformation function.

FIG. 10 illustrates an embodiment of the method according to the invention using DWT-IV as the transformation function.

The DWT-IV of a N-point real input sequence $x(n)$ is defined as follows:

$$y(m) = \sqrt{\frac{2}{N}} \sum_{n=0}^{N-1} x(n) \sin\left(\frac{\pi}{4} + \frac{(m+1/2)(n+1/2)2\pi}{N}\right) \quad (36)$$

$$m, n = 0, 1, \ldots, N-1$$

The transformation matrix $W_N^{IV}$ of DWT-IV is given by $$\underline{W_N^{IV}} = \sqrt{\frac{2}{N}} \left[\sin\left(\frac{\pi}{4} + \frac{(m+1/2)(n+1/2)2\pi}{N}\right)\right]_{m,n=0,1,\ldots,N-1} \quad (37)$$

The DWT-IV matrix is factorised into the following form:

$$W_N^{IV} = R_N T_N P_N \quad (38)$$

$R_N$ is a N×N rotation matrix defined as $$\underline{R_N} = \frac{1}{\sqrt{2}}\begin{bmatrix} I_{N/2} & J_{N/2} \\ -J_{N/2} & I_{N/2} \end{bmatrix} \quad (39)$$

$I_{N/2}$ is the identity matrix of order N/2. $J_{N/2}$ is the counter identity matrix of order N/2, i.e., $$\underline{J_{\frac{N}{2}}} = \begin{bmatrix} & & & & 1 \\ & & & 1 & \\ & & 1 & & \\ & \iddots & & & \\ 1 & & & & \end{bmatrix} \quad (40)$$

$P_N$ is a N×N permutation matrix $$\underline{P_N} = \begin{bmatrix} I_{N/2} & \\ & J_{N/2} \end{bmatrix} \quad (41)$$

T is a N×N matrix given by $$\underline{T} = \frac{1}{\sqrt{2}}\begin{bmatrix} C_{N/2}^{IV} & -C_{N/2}^{IV} \\ C_{N/2}^{IV} D_{N/2} & C_{N/2}^{IV} D_{N/2} \end{bmatrix} \quad (42)$$

where $C_{N/2}^{IV}$ is the DCT-IV matrix of order N/2, i.e., a corresponding transformation matrix of lower dimension.

$$\underline{C_{N/2}^{IV}} = \sqrt{\frac{2}{(N/2)}} \left[\cos\left(\frac{(m+1/2)(n+1/2)\pi}{(N/2)}\right)\right]_{m,n=0,1,\ldots,N/2-1} \quad (43)$$

$D_{N/2}$ is an order N/2 diagonal matrix given by $$\underline{D_{N/2}} = \begin{bmatrix} 1 & & & & \\ & -1 & & & \\ & & 1 & & \\ & & & \ddots & \\ & & & & -1 \end{bmatrix} \quad (44)$$

$R_N$ and T can further be factorised into a product of lifting matrices:

$$\underline{T} = \underline{T_1 T_2 T_3} = \begin{bmatrix} I_{N/2} & \\ K_1 & I_{N/2} \end{bmatrix} \cdot \begin{bmatrix} D_{N/2} & K_2 \\ & I_{N/2} \end{bmatrix} \cdot \begin{bmatrix} I_{N/2} & \\ K_3 & I_{N/2} \end{bmatrix} \quad (45)$$

where $$\underline{K_1} = (\sqrt{2}\, I_{N/2} - C_{N/2}^{IV} D_{N/2}) C_{N/2}^{IV}$$

$$\underline{K_2} = \frac{-C_{N/2}^{IV}}{\sqrt{2}}$$

$$\underline{K_3} = \sqrt{2}\, C_{N/2}^{IV} D_{N/2} - I_{N/2},$$

and $$\underline{R_N} = \underline{R_1 R_2 R_3} = \begin{bmatrix} I_{N/2} & \\ H_1 & I_{N/2} \end{bmatrix} \cdot \begin{bmatrix} I_{N/2} & H_2 \\ & I_{N/2} \end{bmatrix} \cdot \begin{bmatrix} I_{N/2} & \\ H_3 & I_{N/2} \end{bmatrix} \quad (46)$$

where $$\underline{H_1} = \underline{H_3} = -\tan(\pi/8) \cdot J_{N/2} \quad (47)$$

$$= \begin{bmatrix} & & & -0.414 \\ & & -0.414 & \\ & \iddots & & \\ -0.414 & & & \end{bmatrix}$$

and $$\underline{H_2} = \sin(\pi/4) \cdot J_{N/2} = \begin{bmatrix} & & & 0.707 \\ & & 0.707 & \\ & \iddots & & \\ 0.707 & & & \end{bmatrix} \quad (48)$$

Thus, equation (38) can be written in the form $$C_N^{IV} = R_1 R_2 R_3 T_1 T_2 T_3 P_N \quad (49)$$

The lifting matrices $R_3$ and $T_1$ can be aggregated to the lifting matrix S:

$$S = R_3 T_1 = \begin{bmatrix} I_{N/2} & \\ H_3 + K_1 & I_{N/2} \end{bmatrix} \quad (50)$$

From (49) and (50), the following factorisation formula for the DWT-IV matrix can be obtained:

$$C_N^{IV} = R_1 R_2 S\, T_2 T_3 P_N \quad (51)$$

Equation (51) indicates that a transforming element for the integer DWT-IV transform can be used which comprises five lifting stages. Each lifting matrix S, $T_2$ and $T_3$ in (51) comprises the auxiliary matrix $C_{N/2}^{IV}$ which is the transformation matrix itself.

Further, the transforming element comprises a data shuffling stage corresponding to the permutation matrix $P_N$. The data shuffling stage rearranges the components order in each input data block. According to $P_N$, the input data vector is rearranged in the following way: the first half of vector remains unchanged; the second half of vector is flipped, i.e.:

$$\underline{P_N x} = P_N \begin{bmatrix} x_1 \\ x_2 \\ \vdots \\ x_{N/2} \\ x_{N/2+1} \\ \vdots \\ x_{N-1} \\ x_N \end{bmatrix} = \begin{bmatrix} x_1 \\ x_2 \\ \vdots \\ x_{N/2} \\ x_N \\ x_{N-1} \\ \vdots \\ x_{N/2+1} \end{bmatrix} \quad (52)$$

In FIG. 10, the input of the first lifting stage are the two blocks of the digital signal $x_1$ and $x_2$, $z_1$, $z_2$ and $z_3$ are intermediate signals and $y_1$ and $y_2$ are output signals corresponding to the first and second block of the digital signal, respectively.

The input of the transforming element x and the two input blocks of the first lifting stage of the transforming element $x_1$ and $x_2$ fulfil the equation $$\begin{bmatrix} x_1 \\ x_2 \end{bmatrix} = \underline{P_N x} \quad (53)$$

In the following, the first lifting stage 1001 is explained, which is the lifting stage corresponding to the lifting matrix $T_3$.

Let $$\begin{bmatrix} v_1 \\ v_2 \end{bmatrix}$$

be the output vector of the first lifting stage, for the time being without rounding to integer values, i.e.

$$\begin{bmatrix} v_1 \\ v_2 \end{bmatrix} = T_3 \begin{bmatrix} x_1 \\ x_2 \end{bmatrix} \quad (54)$$

Using the definition of $T_3$ provided by equation (45), equation (51) is re-written as $$\begin{bmatrix} v_1 \\ v_2 \end{bmatrix} = \begin{bmatrix} I_{\frac{N}{2}} & \\ K_3 & I_{\frac{N}{2}} \end{bmatrix} \begin{bmatrix} x_1 \\ x_2 \end{bmatrix} \quad (55)$$

Since in this embodiment, a reversible algorithm for integer DWT-IV in this provided, there is included a rounding to integer values. So, according to equation (55), in the first step 1006 of the first lifting stage 1001, $x_1$ is multiplied by $K_3$. The result of this multiplication is rounded to integer values in step 1007. The rounded values are then added to $x_2$ in step 1008. Thus, the intermediate signal $z_1$ fulfils the equation $$z_1 = \lfloor K_3 \cdot x_1 \rfloor + x_2 \quad (56)$$

where $\lfloor \bullet \rfloor$ denotes rounding operation.

Since the other four lifting stages 1002, 1003, 1004, 1005 of the transforming element illustrated in FIG. 10, which correspond to the matrices $T_2$, S, $R_2$ and $R_1$ respectively, have identical structures as the first lifting stage 1001, their explanation is omitted. It only has to be noted that in the adding step 1009 of the second lifting step 1002, $x_1$ is, according to the definition of $T_2$, multiplied with $D_{N/2}$.

In the following, the lifting stages of the transforming element of the reverse transformation are explained with reference to FIG. 11.

Figure 11:
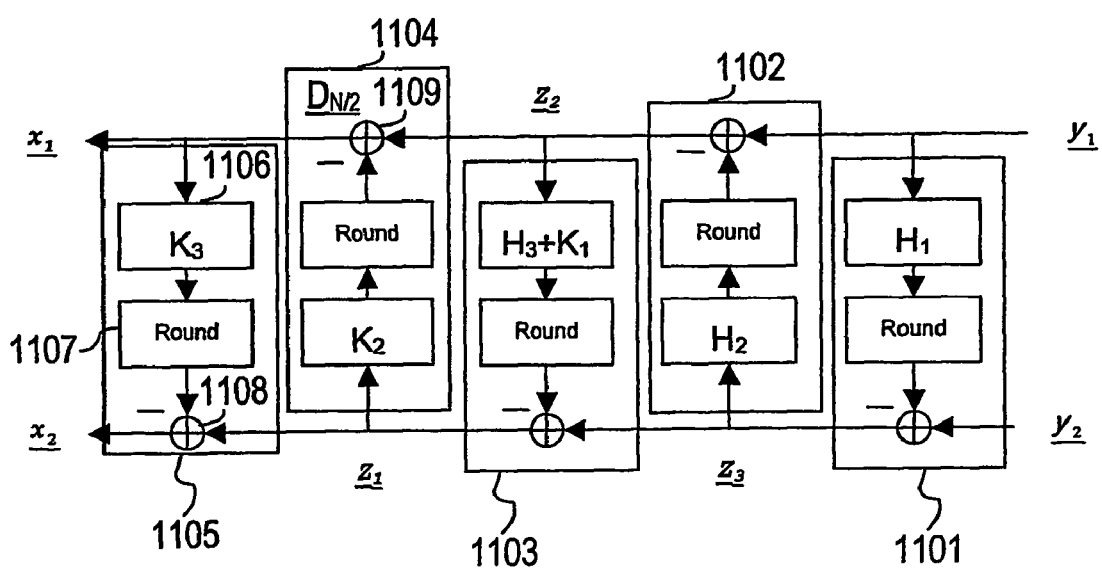
FIG. 11 illustrates the algorithm for the reverse transformation according to the embodiment of the method according to the invention illustrated in FIG. 10.

FIG. 11 illustrates the lifting stages of the transforming element for the reverse transformation of the transformation illustrated in FIG. 10.

In FIG. 11, the input of the first lifting stage are the two blocks of the digital signal $y_1$ and $y_2$, $z_1$, $z_2$ and $z_3$ are intermediate signals and $x_1$ and $x_2$ are output signals corresponding to the first and second block of the digital signal, respectively.

The last lifting stage 1105 illustrated in FIG. 11 is inverse to the first lifting stage 1001 illustrated in FIG. 10. So, in the first step 1106 of the last lifting stage 1105, $x_1$ is multiplied by $K_3$. The result of this multiplication is rounded to integer values in step 1107. The rounded values are then subtracted from $z_1$ in step 1108. Thus, the signal $x_2$ fulfils the equation $$x_2 = z_1 - \lfloor K_3 \cdot x_1 \rfloor \quad (57)$$

where $\lfloor \bullet \rfloor$ denotes rounding operation.

Since the other four lifting stages 1101, 1102, 1103, 1104 of the transforming element illustrated in FIG. 11, which are inverse to the lifting stages 1005, 1004, 1003 and 1002 respectively, have identical structures as the last lifting stage 1105, their explanation is omitted. It only has to be noted that after the adding step 1109 of the fourth lifting step 1104, the result of the adding step 1109 is multiplied with $D_{N/2}$ to produce $x_1$.

It can be seen that the lifting stages 1105, 1104, 1103, 1102 and 1101 of FIG. 11 are inverse to the lifting stages 1001 to 1005 of FIG. 10, respectively. Since also the permutation of the input signal corresponding to the matrix $P_N$ can be reversed and an according data shuffling stage is comprised by the inverse transforming element, the whole provided method is reversible, thus, if used in the lossless image encoder 903 and the lossless image decoder 905 illustrated in FIG. 9, providing a method and an apparatus for lossless image coding.

Although in the explained embodiments, the embodiments of the method according to the invention for DCT-IV were used for audio coding and the embodiment of the method according to the invention for DWT-IV was used for image coding, the embodiments of the method according to the invention for DCT-IV can as well be used for image coding, the embodiment of the method according to the invention for DWT-IV can as well be used audio coding and all can be used as well for the coding of other digital signals, such as video signals.

Considering the equations (34) and (35) one sees that there are N/2 roundings in each lifting stage. Therefore, considering equation (26), one sees that the total rounding number for the transforming element for the embodiment of the DCT-IV algorithm illustrated in FIGS. 7 and 8 according to the invention is five times N/2, that is 2.5N, which is significantly lower than $N \log_2 N$ according to the state of the art.

Again considering equation (29), one sees that the majority of computation power is used in the four N/2 point DCT-IV subroutines corresponding to a multiplication with $C_{N/2}^{IV}$, when N is a large value, e.g. N=1024. Because the floating-point DCT-IV can be calculated using two half-length DCT-IV plus pre- and post-rotations, the arithmetic complexity of the proposed integer DCT-IV is roughly estimated to be twice that of the floating-point DCT-IV.

A similar conclusion can be drawn for the integer DWT-IV transformation function.

In the following, a further embodiment of the method for the transformation of a digital signal from the time domain to the frequency domain and vice versa according to the invention is explained.

In this embodiment of the present invention, the domain transformation is a DCT transform, whereby the block size N is some integer and where the input vector comprises two sub-vectors.

Let $C_N^{II}$ be the N×N transform matrix of DCT (also called Type-II DCT):

$$C_N^{II} = \sqrt{2/N} \, [k_m \cos(m(n+1/2)\pi/N)] \quad (58)$$
$$m, n = 0, 1, \cdots, N-1$$

where:

$$k_m = \begin{cases} 1/\sqrt{2} & \text{if } m = 0 \\ 1 & \text{if } m \neq 0 \end{cases} \quad (59)$$

and N is the transform size which can be a power of two, $N=2^i$ in one embodiment and i is an integer greater than zero. m and n are matrix indices.

Let $C_N^{IV}$ be the N×N transform matrix of type-IV DCT, as already defined above:

$$C_N^{IV} = \sqrt{2/N} \, [\cos((m+1/2)(n+1/2)\pi/N)] \quad (60)$$
$$m, n = 0, 1, \cdots, N-1$$

As above, a plurality of lifting matrices will be used, which lifting matrices are in this embodiment 2N×2N matrices of the following form:

$$L_{2N} = \begin{bmatrix} \pm I_N & A_N \\ O_N & \pm I_N \end{bmatrix} \quad (61)$$

where $I_N$ is the N×N identity matrix, $O_N$ is the N×N zero matrix, $A_N$ is an arbitrary N×N matrix.

For each lifting matrix $L_{2N}$, a lifting stage reversible integer to integer mapping is realized in the same way as the 2×2 lifting step described in the incorporated reference "Factoring Wavlet Transforms into Lifting Steps," *Tech. Report*, I. Daubechies and W. Sweldens, Bell Laboratories, Lucent Technologies, 1996. The only difference is that rounding is applied to a vector instead of a single variable.

In the above description of the other embodiments, it was already detailed how a lifting stage is realized for a lifting matrix, so the explanation of the lifting stages corresponding to the lifting matrices will be omitted in the following.

One sees that the transposition of $L_{2N}$, $L_{2N}^T$ is also a lifting matrix.

In this embodiment, the transforming element corresponds to a matrix, $T_{2N}$ which is defined as a 2N×2N matrix in the following way:

$$T_{2N} = \begin{bmatrix} C_N^{IV} & O_N \\ O_N & C_N^{IV} \end{bmatrix} \quad (62)$$

The decomposition of the matrix $T_{2N}$ into lifting matrices has the following form:

$$T_{2N} = P3 \cdot L8 \cdot L7 \cdot L6 \cdot P2 \cdot L5 \cdot L4 \cdot L3 \cdot L2 \cdot L1 \cdot P1 \quad (63)$$

The matrices constituting the right hand side of the above equation will be explained in the following.

P1 is a first permutation matrix given by the equation $$P1 = \begin{bmatrix} O_N & D_N \\ J_N & O_N \end{bmatrix} \quad (64)$$

where $J_N$ is the N×N counter index matrix given by $$J_N = \begin{bmatrix} 0 & 0 & 0 & 1 \\ 0 & 0 & 1 & 0 \\ 0 & \cdot^{\cdot^{\cdot}} & 0 & 0 \\ 1 & 0 & 0 & 0 \end{bmatrix} \quad (65)$$

and $D_N$ is a N×N diagonal matrix with diagonal element being 1 and −1 alternatively:

$$D_N = \begin{bmatrix} 1 & 0 & 0 & 0 & 0 \\ 0 & -1 & 0 & 0 & 0 \\ 0 & 0 & 1 & 0 & 0 \\ 0 & 0 & 0 & \ddots & 0 \\ 0 & 0 & 0 & 0 & -1 \end{bmatrix} \quad (66)$$

P2 is a second permutation matrix, an example of which is generated by the following MATLAB script:

```
Pd = eye(2*N);
for i = 2:2:N,
    Pd(i,i) = 0; Pd(N+i,N+i) = 0;
    Pd(i,N+i) = 1; Pd(N+i,i) = 1;
end
Peo = zeros(2*N);
for i = 1:N,
    Peo(i,2*i-1) = 1;
    Peo(i+N,2*i) = 1;
end
P2 = (Pd*Peo)';
```

As an example, when N is 4, P2 is a 8×8 matrix given as $$P_2 = \begin{bmatrix} 1 & 0 & 0 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 1 & 0 & 0 & 0 & 0 \end{bmatrix} \text{ for } N = 4 \qquad (67)$$

P3 is a third permutation matrix, an example of which is generated by the following MATLAB script:

```
P3 = zeros(2*N);
for i = 1:N,
    P3(i,2*i-1) = 1;
    P3(N2-i+1,2*i) = 1;
end
```

As an example, when N is 4, P3 is a 8×8 matrix given as $$P_3 = \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 1 & 0 & 0 \\ 0 & 0 & 0 & 1 & 0 & 0 & 0 & 0 \\ 0 & 1 & 0 & 0 & 0 & 0 & 0 & 0 \end{bmatrix} \text{ for } N = 4 \qquad (68)$$

L1 is a first lifting matrix $$L1 = \begin{bmatrix} I_N & O_N \\ Z1_N & I_N \end{bmatrix} \qquad (69)$$

where $Z1_N$ is a N×N counter diagonal matrix given as:

$$Z1_N = \begin{bmatrix} 0 & 0 & 0 & -\tan(\pi/8N) \\ 0 & 0 & -\tan(3\pi/8N) & 0 \\ 0 & \cdot\cdot\cdot & 0 & 0 \\ -\tan((2N-1)\pi/8N) & 0 & 0 & 0 \end{bmatrix} \qquad (70)$$

L2 is a second lifting matrix:

$$L2 = \begin{bmatrix} I_N & Z2_N \\ O_N & I_N \end{bmatrix} \qquad (71)$$

where $Z2_N$ is a N×N counter diagonal matrix given as:

$$Z2_N = \begin{bmatrix} 0 & 0 & 0 & \sin((2N-1)\pi/4N) \\ 0 & 0 & \cdot\cdot\cdot & 0 \\ 0 & \sin(3\pi/4N) & 0 & 0 \\ \sin(\pi/4N) & 0 & 0 & 0 \end{bmatrix} \qquad (72)$$

L3 is a third lifting matrix:

$$L3 = \begin{bmatrix} I_N & O_N \\ Z3_N & I_N \end{bmatrix} \qquad (73)$$

where:

$$Z3_N = \sqrt{2} C_N^{IV} + I_N + Z1_N \qquad (74)$$

L4 is a fourth lifting matrix:

$$L4 = \begin{bmatrix} -I_N & Z4_N \\ O_N & I_N \end{bmatrix} \qquad (75)$$

where:

$$Z4_N = C_N^{IV}/\sqrt{2} \qquad (76)$$

L5 is a fifth lifting matrix:

$$L5 = \begin{bmatrix} I_N & O_N \\ Z5_N & I_N \end{bmatrix} \qquad (77)$$

where:

$$Z5_N = -(\sqrt{2} C_N^{IV} + I_N) \qquad (78)$$

L6 is a sixth lifting matrix:

$$L6 = \begin{bmatrix} I_N & O_N \\ Z6_N & I_N \end{bmatrix} \qquad (79)$$

where $Z6_N$ is a N×N counter diagonal matrix given as:

$$Z6_N = \begin{bmatrix} 0 & 0 & 0 & \tan(\pi/8) \\ 0 & 0 & \tan(\pi/8) & 0 \\ 0 & \cdot\cdot\cdot & 0 & 0 \\ \tan(\pi/8) & 0 & 0 & 0 \end{bmatrix} \qquad (80)$$

L7 is a seventh lifting matrix:

$$L7 = \begin{bmatrix} I_N & Z7_N \\ O_N & I_N \end{bmatrix} \qquad (81)$$

where $Z7_N$ is a N×N counter diagonal matrix given as:

$$Z7_N = \begin{bmatrix} 0 & 0 & 0 & -\sin(\pi/4) \\ 0 & 0 & \cdot{\cdot}{\cdot} & 0 \\ 0 & -\sin(\pi/4) & 0 & 0 \\ -\sin(\pi/4) & 0 & 0 & 0 \end{bmatrix} \quad (82)$$

L8 is an eighth lifting matrix:

$$L8 = L6 \quad (83)$$

thus, resulting in the factorization as shown in (x):

$$T_{2N} = P3 \cdot L8 \cdot L7 \cdot L6 \cdot P2 \cdot L5 \cdot L4 \cdot L3 \cdot L2 \cdot L1 \cdot P1 \quad (84)$$

where P1, P2, and P3 are three permutation matrices. Lj, j from 1 to 8, are eight lifting matrices.

The lifting matrices L3, L4 and L5 comprise an auxiliary transformation matrix, which is, in this case, the transformation matrix $C_N^{IV}$ itself.

From Eq. (84), it is possible to compute the integer DCT for two input signals of dimension N×1.

As Eq. (84) provides a lifting matrix factorization which describes the DCT-IV transformation domain, its lifting matrices can be used in the manner shown herein to compute the domain transformation of an applied input signal.

The equation (84) can be derived in the following way.

The following decomposition can be derived using the disclosure from Wang, Zhongde, "On Computing the Discrete Fourier and Cosine Transforms", IEEE Transactions on Acoustics, Speech and Signal Processing, Vol. ASSP-33, No. 4 October 1985:

$$C_N^{IV} = (B_N)^T \cdot (P_N)^T \cdot \begin{bmatrix} C_{N/2}^{II} & \\ & \overline{\overline{S_{N/2}^{II}}} \end{bmatrix} \cdot T_N \quad (85)$$

$$= (B_N)^T \cdot (P_N)^T \cdot \begin{bmatrix} C_{N/2}^{II} & \\ & C_{N/2}^{II} \end{bmatrix} \cdot P_{DJ} \cdot T_N$$

is known, wherein $S_{N/2}^{II}$ denotes the transformation matrix of the discrete sine transform of type 2, $$P_{DJ} = \begin{bmatrix} I & \\ & D \cdot J \end{bmatrix}$$

$P_N$ is a N×N permutation matrix given by (86)

$$\underline{P_N} = \begin{bmatrix} \underline{I_{N/2}} & \\ & \underline{J_{N/2}} \end{bmatrix}$$

$$\underline{T_N} = \begin{bmatrix} \cos\frac{\pi}{4N} & & & & & & & \sin\frac{\pi}{4N} \\ & \cos\frac{3\pi}{4N} & & & & & \sin\frac{3\pi}{4N} & \\ & & \ddots & & & \cdot{\cdot}{\cdot} & & \\ & & & \cos\frac{(N-1)\pi}{4N} & \sin\frac{(N-1)\pi}{4N} & & & \\ & & & -\sin\frac{(N-1)\pi}{4N} & \cos\frac{(N-1)\pi}{4N} & & & \\ & & \cdot{\cdot}{\cdot} & & & \ddots & & \\ & -\sin\frac{3\pi}{4N} & & & & & \cos\frac{3\pi}{4N} & \\ -\sin\frac{\pi}{4N} & & & & & & & \cos\frac{\pi}{4N} \end{bmatrix}$$

and $$B_N = \frac{1}{\sqrt{2}} \begin{bmatrix} \sqrt{2} & & & & & \\ & 1 & -1 & & & \\ & 1 & 1 & & & \\ & & & \ddots & & \\ & & & & 1 & -1 \\ & & & & 1 & 1 \\ & & & & & & \sqrt{2} \end{bmatrix}$$

Equation (85) can be combined with the equation $$C_N^{IV} = R_{PO} \cdot \begin{bmatrix} C_{N/2}^{IV} & \\ & C_{N/2}^{IV} \end{bmatrix} \cdot R_{PR} \cdot P_D \cdot P_{EO} \quad (87)$$

wherein $P_{EO}$ is an even-odd permutation matrix, $$R_{Pr} = \frac{1}{\sqrt{2}} \begin{bmatrix} I_{N/2} & I_{N/2} \\ I_{N/2} & -I_{N/2} \end{bmatrix}$$

$R_{PO}$ equals $T_N$, $$P_D = \begin{bmatrix} I_{\frac{N}{2}} & \\ & D_{\frac{N}{2}} \end{bmatrix}$$

After transposition equation (87) converts to $$C_N^{IV} = (P_{EO})^T \cdot (P_D)^T \cdot R_{PR} \cdot \begin{bmatrix} C_{N/2}^{IV} & \\ & C_{N/2}^{IV} \end{bmatrix} \cdot (R_{PO})^T \quad (88)$$

$$= (P_{EO})^T \cdot (P_D)^T \cdot \frac{1}{\sqrt{2}} \begin{bmatrix} C_{N/2}^{IV} & C_{N/2}^{IV} \\ C_{N/2}^{IV} & -C_{N/2}^{IV} \end{bmatrix} \cdot (R_{PO})^T$$

The combination of (85) and (88) yields $$\begin{bmatrix} C_{N/2}^{II} & \\ & C_{N/2}^{II} \end{bmatrix} = P_N \cdot B_N \cdot (P_{EO})^T \cdot \frac{1}{\sqrt{2}} \begin{bmatrix} C_{N/2}^{IV} & C_{N/2}^{IV} \\ C_{N/2}^{IV} & -C_{N/2}^{IV} \end{bmatrix} \cdot \quad (89)$$
$$(R_{PO})^T \cdot T_N \cdot (P_{DJ})^T$$

$$= P_3 \cdot R_2 \cdot P_2 \cdot \frac{1}{\sqrt{2}} \begin{bmatrix} C_{N/2}^{IV} & C_{N/2}^{IV} \\ C_{N/2}^{IV} & -C_{N/2}^{IV} \end{bmatrix} \cdot R_1 \cdot P_1$$

where $P_1 = (P_{DJ})^T$ $P_2 = (P_{EO})^T \cdot (P_D)^T = (P_D \cdot P_{EO})^T$ $P_3 = P_N$ $R_1 = (R_{PO})^T \cdot T_N$ $R_2 = B_N$ from (89), equation (84) can be easily derived.

In this embodiment, the computation of the domain transformation requires only 4N rounding operations, as will now be explained:

Let $\alpha(*)$ be the number of real additions, $\mu(*)$ be the number of real multiplications, and $\gamma(*)$ be the number of real roundings, respectively. For the proposed IntDCT algorithm, one gets:

$\alpha(\text{IntDCT}) = 11N + 3\alpha(\text{DCT-IV})$ $\mu(\text{IntDCT}) = 9N + 3\mu(\text{DCT-IV})$ $\gamma(\text{IntDCT}) = 8N$ The above results are for two blocks of data samples, because the proposed IntDCT algorithm processes them together. Thus for one block of data samples, the numbers of calculations are halved, which are $$\alpha_1(\text{IntDCT}) = 5.5N + 1.5\alpha(\text{DCT-IV})$$
$$\mu_1(\text{IntDCT}) = 4.5N + 1.5\mu(\text{DCT-IV})$$
$$\gamma_1(\text{IntDCT}) = 4N$$

where $\alpha_1$, $\mu_1$, and $\gamma_1$ are the number of real additions, number of real multiplications, and number of real roundings, for one block of samples, respectively.

For DCT-IV calculation, the FFT-based algorithm described in the incorporated reference "Signal Processing with lapped Transforms," H. S. Malvar, Norwood, Mass. Artech House, 1992, pp. 199-201 can be used, for which $\alpha(\text{DCT-IV}) = 1.5N \log_2 N$ $\mu(\text{DCT-IV}) = 0.5N \log_2 N + N$ Consequently:

$\alpha_1(\text{IntDCT}) = 2.25N \log_2 N + 5.5N$ $\mu_1(\text{IntDCT}) = 0.75N \log_2 N + 6N$ In the following, a further embodiment of the method for the transformation of a digital signal from the time domain to the frequency domain and vice versa according to the invention is explained.

In this embodiment a discrete fast fourier transform (FFT) is used as the domain transformation.

Let F be the N×N transform matrix of the normalized FFT $$F = \sqrt{\frac{1}{N}} \left[ \exp\left(\frac{-j2\pi mn}{N}\right) \right] \quad (91)$$

$m, n = 0, 1, \ldots, N-1$ where N is the transform size which is some positive integer and, in one embodiment, can be a power of two, $N = 2^i$ and i is an integer greater than zero. m and n are matrix indices.

Under this embodiment, a permutation matrix P of dimension N×N is a matrix which includes indices 0 or 1. After multiplying it with a N×1 vector (the matrix representation of the input signal), the order of elements in the vector are changed.

In this embodiment, lifting matrices are defined as 2N×2N matrices of the following form:

$$L = \begin{bmatrix} P_1 & A \\ O & P_2 \end{bmatrix} \quad (92)$$

where $P_1$ and $P_2$ are two permutation matrices, O is the N×N zero matrix, A is an arbitrary N×N matrix. For lifting matrix L, reversible integer to integer mapping is realized in the same way as the 2×2 lifting step in the aforementioned incorporated reference of I. Daubechies. As above, however, rounding is applied to a vector instead of a single variable. It is apparent that the transposition of L, $L^T$ is also a lifting matrix.

Further, let T be a 2N×2N transform matrix:

$$T = \begin{bmatrix} O & F \\ F & O \end{bmatrix} \quad (93)$$

Accordingly, the modified transform matrix T (and accordingly the domain transformation itself) can be expressed as the lifting matrix factorization:

$$T = \begin{bmatrix} I & O \\ -Q \cdot F & I \end{bmatrix} \cdot \begin{bmatrix} -Q & F \\ O & I \end{bmatrix} \cdot \begin{bmatrix} I & O \\ F & I \end{bmatrix} \quad (94)$$

where I is the N×N identity matrix, and Q is a N×N permutation matrix given as:

$$Q = \begin{bmatrix} 1 & O_{1 \times N-1} \\ O_{N-1 \times 1} & J \end{bmatrix} \quad (95)$$

and $O_{1 \times N-1}$ and $O_{N-1 \times 1}$ are row and column vectors of N−1 zeros respectively.

J is the (N−1)×(N−1) counter index matrix given by $$J = \begin{bmatrix} & & & 1 \\ & & 1 & \\ & \cdot^{\cdot^{\cdot}} & & \\ 1 & & & \end{bmatrix} \quad (96)$$

In Eq. (96), blank space in the square bracket represents all zeros matrix elements.

The lifting matrices on the right hand side of equation (94) comprise an auxiliary transformation matrix, which is, in this case, the transformation matrix F itself.

A can be seen from Eq. (94), the lifting matrix factorization can be use to compute the integer FFT for two N×1 complex vectors using the methods as described herein.

Under this embodiment, the computation of the domain transformation requires only 3N rounding operations, as will now be explained:

Let:
$\alpha(*)$ be the number of real additions,
$\mu(*)$ be the number of real multiplications, and
$\gamma(*)$ be the number of real rounding operations, respectively.

For the proposed IntFFT algorithm, we have $\alpha(\text{IntFFT}) = 6N + 3\alpha(\text{FFT})$ $\mu(\text{IntFFT}) = 3\mu(\text{FFT})$ $\gamma(\text{IntFFT}) = 6N$ The above results are for two blocks of data samples, because the proposed IntFFT algorithm processes them together. Thus for one block of data samples, the numbers of calculations are halved, which are $\alpha_1(\text{IntFFT}) = 3N + 1.5\alpha(\text{FFT})$ $\mu_1(\text{IntFFT}) = 1.5\mu(\text{FFT})$ $\gamma_1(\text{IntFFT}) = 3N$ where $\alpha_1$, $\mu_1$, and $\gamma_1$ are the number of real additions, number of real multiplications, and number of real rounding operations for one block of samples, respectively.

Figure 13:
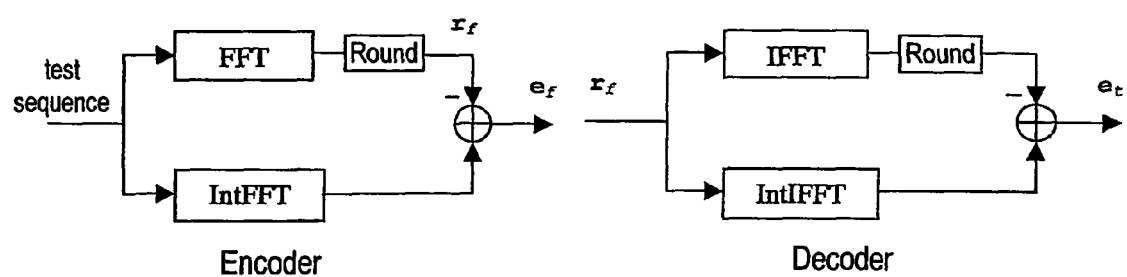
FIG. 13 shows forward and reverse transform coders used to assess the transform accuracy of presented DCT and FFT transformation methods in accordance with the present invention.

For FFT calculation, the split-radix FFT (SRFFT) algorithm can be used, for which:

$\alpha(\text{SRFFT}) = 3N \log_2 N - 3N + 4$ $\mu(\text{SRFFT}) = N \log_2 N - 3N + 4$ Consequently, we have:

$\alpha_1(\text{IntFFT}) = 4.5N \log_2 N - 1.5N + 6$ $\mu_1(\text{IntFFT}) = 1.5N \log_2 N - 4.5N + 6$ FIG. 13 shows forward and reverse transform coders used to assess the transform accuracy of the DCT transformation technique described above and the FFT domain transformation above. The test involved measuring the mean squared error (MSE) of the transform in accordance with the evaluation standards proposed by the MPEG-4 lossless audio coding group as described in "Coding of Moving Pictures and Audio: Work plan for Evaluation of Integer MDCT for FGS to Lossless Experimentation Framework," ISO/IEC JTC 1/SC 29/WG 11 N5578 Pattaya, Thailand, March 2003 incorporated herein.

Specifically, the MSEs for IntDCT and integer inverse DCT (IntIDCT) are given as:

$$MSE = \frac{1}{K} \sum_{j=0}^{K-1} \frac{1}{N} \sum_{i=0}^{N-1} e_i^2 \quad (97)$$

where the error signal e is $e_f$ for IntDCT, and $e_r$ for IntIDCT as in FIG. 1. K is the total number of sample blocks used in the evaluation.

The MSEs for IntFFT and integer inverse FFT (IntIFFT) are given as $$MSE = \frac{1}{K} \sum_{j=0}^{K-1} \frac{1}{N} \sum_{i=0}^{N-1} \|e_i\|^2 \quad (98)$$

where the error signal e is $e_f$ for IntFFT, and $e_r$ for IntIFFT as in FIG. 1. $\|*\|$ represents norm of a complex value. K is the total number of sample blocks used in the evaluation.

For both domain transformations, a total of 450 seconds with 15 different types of music files are used in the 48 kHz/16-bit test set. Table I shows the test results.

As can be seen from Table 1, the MSE generated using the systems and methods of the present invention is very minimal, and unlike conventional systems, is substantially independent of the processing block size. Referring to the DCT-IV domain transformation, the MSE only slightly increases with increasing block size N up to 4096 bits. The MSEs of the FFT are even better, exhibiting a constant MSE of 0.4 for block sizes up to 4096 bits. When the demonstrated performance of the present invention is viewed in light of the present capabilities and increasing need for longer block sizes, the advantages of the present invention become clear.

TABLE I

| N | IntDCT-IV | IntIDCT-IV | IntFFT | IntIFFT |
| --- | --- | --- | --- | --- |
| 8 | 0.537 | 0.537 | 0.456 | 0.371 |
| 16 | 0.546 | 0.546 | 0.480 | 0.412 |
| 32 | 0.549 | 0.548 | 0.461 | 0.391 |
| 64 | 0.550 | 0.550 | 0.462 | 0.393 |
| 128 | 0.551 | 0.551 | 0.461 | 0.391 |
| 256 | 0.552 | 0.552 | 0.461 | 0.391 |
| 512 | 0.552 | 0.552 | 0.461 | 0.391 |
| 1024 | 0.552 | 0.552 | 0.460 | 0.391 |
| 2048 | 0.552 | 0.552 | 0.461 | 0.391 |
| 4096 | 0.553 | 0.552 | 0.461 | 0.391 |

INCORPORATED REFERENCES

The following documents are herein incorporated by reference:

H. S. Malvar, "Signal Processing with Lapped Transforms" Artech House, 1992;

R. Geiger, T. Sporer, J. Koller, K. Brandenburg, "Audio Coding based on Integer Transforms" AES 111$^{th}$ Convention, New York, USA, September 2001;

Wang, Zhongde, "On Computing the Discrete Fourier and Cosine Transforms", IEEE Transactions on Acoustics, Speech and Signal Processing, Vol. ASSP-33, No. 4 October 1985;

I. Daubechies and W. Sweldens, "Factoring wavelet transforms into lifting steps", *Tech. Report*, Bell Laboratories, Lucent Technologies, 1996;

S. Oraintara, Y. J. Chen and T. Q. Nguyen, "Integer fast Fourier transform", *IEEE Trans. Signal Processing*, vol. 50, no. 3, March 2002, pp. 607-618;

P. Hao and Q. Shi, "Matrix factorizations for reversible integer mapping," *IEEE Trans. Signal Processing*, vol. 49, no. 10, October 2001, pp. 2314-2324;

G. Plonka and M. Tasche, "Invertible integer DCT algorithms", *Appl. Comput. Harmon. Anal.* 15:70-88, 2003;

Y. H. Zeng, L. Z. Cheng, G. A. Bi, and Alex C. Kot, "Integer DCTs and fast algorithms", *IEEE Trans. Signal Processing*, vol. 49, no. 11, November 2001, pp. 2774-2782;

J. Wang, J. Sun and S. Yu, "1-D and 2-D transforms from integers to integers", in *Proc. Int. Conf. Acoustics, Speech and Signal Processing*, Hong Kong, 2003, vol. II, pp. 549-552;

"Coding of Moving Pictures and Audio: Work plan for Evaluation of Integer MDCT for FGS to Lossless Experimentation Framework", ISO/IEC JTC 1/SC 29/WG 11N5578, Pattaya, Thailand, March 2003.

The invention claimed is:

1. A method carried out by an audio, image or video processing device for performing a domain transformation of a digital signal from the time domain into the frequency domain and vice versa, the digital signal being an audio signal, an image signal or a video signal, the method comprising:
performing the transformation by a transforming element comprising a plurality of lifting stages, wherein the transformation corresponds to a transformation matrix and wherein at least one lifting stage of the plurality of lifting stages comprises at least one auxiliary transformation matrix and a rounding unit, the auxiliary transformation matrix comprising the transformation matrix itself or the corresponding transformation matrix of lower dimension; and
performing a rounding operation of the signal by the rounding unit after the transformation by the auxiliary transformation matrix.

2. The method of claim 1, wherein the transformation is a DCT-I transformation, DCT-IV transformation, DST-I transformation, DFT-I transformation, a DFT-IV transformation, DST-IV transformation, DWT-I transformation or DWT-IV transformation.

3. The method of claim 2 wherein each lifting stage corresponds to a lifting matrix, wherein the lifting matrix is a block-triangular matrix comprising four sub-matrices with two invertible integer matrices as two of the sub-matrices in one diagonal.

4. The method of claim 3, wherein the invertible integer matrices in each lifting matrix are diagonal matrices with components which are either one or minus one.

5. The method of claim 1 wherein each lifting stage corresponds to a lifting matrix, wherein the lifting matrix is a block-triangular matrix comprising four sub-matrices with two invertible integer matrices as two of the sub-matrices in one diagonal.

6. The method of claim 5, wherein the invertible integer matrices in each lifting matrix are diagonal matrices with components which are either one or minus one.

7. The method of claim 1 wherein the transforming element comprises three lifting stages.

8. The method of claim 1 wherein the transforming element comprises five lifting stages.

9. The method of claim 1 wherein the transforming element comprises eight lifting stages.

10. A device for performing a domain transformation of a digital signal from the time domain into the frequency domain and vice versa, the device comprising:
a transformation unit comprising a transforming element for performing the transformation which transforming element comprises a plurality of lifting stages,
wherein the transformation corresponds to a transformation matrix, and wherein each lifting stage comprises at least one auxiliary transformation matrix, which is the transformation matrix itself or the respective transformation matrix of lower dimension and wherein each lifting stage further comprises a rounding unit,
whereby, the signal is processed by the respective rounding unit after the transformation by the respective auxiliary transformation matrix.

11. The device of claim 10, wherein the transformation unit comprises:
a modified discrete cosine transform device coupled to receive the a plurality of data blocks and configured to domain transform each data block into MDCT coefficients;
a quantizer coupled to receive each of the MDCT coefficients, the quantizer operable to produce, in response, quantized MDCT coefficients;
a bit stream encoder coupled to receive the quantized MDCT coefficients, the bit stream producing, in response, a perceptually coded bit stream;
an inverse quantizer coupled to receive the quantized MDCT coefficients, the inverse quantizer operable to restore the MDCT coefficients to an non-quantized state; and
a rounding unit coupled to receive the restored MDCT coefficients and operable to produce integer value MDCT coefficients.

12. The device of claim 11, wherein the transformation unit further comprises:
an integer modified discrete cosine transform device coupled to receive the data blocks and operable to produce, in response, IntMDCT coefficients;

means for computing the difference between respective IntMDCT coefficients and integer value MDCT coefficients to produce respective residual MDCT coefficients; and an entropy coder coupled to receive the residual MDCT coefficients and operable to generate, in response, a lossless enhancement bitstream.

13. The device of claim 12, wherein the transformation unit further comprises:
- a bitstream decoder coupled to receive the perceptually coded bitstream and operable to output, in response, a decoded bitstream;
- an inverse quantizer coupled to receive the decoded bitstream and to produce, in response, restored MDCT coefficients;
- a rounding unit coupled to receive the restored MDCT coefficients and operable to round each MDCT coefficient to an integer value; and
- an inverse MDCT device coupled to receive the restored MDCT stream, and to produce in generate in response, a reconstructed copy of the perceptually coded signal.

14. The device of claim 13, wherein the transformation unit comprises:
- an entropy decoder coupled to receive the lossless bit stream and operable to generate, in response, residual IntMDCT coefficients;
- means for adding the residual IntMDCT coefficients to the integer value MDCT coefficients to produce IntMDCT coefficients; and
- an inverse IntMDCT device coupled to receive the summation of the integer value MDCT coefficients and the IntMDCT coefficients to produce a reconstructed copy of the losslessly coded audio signal.

15. A computer readable medium having a program recorded thereon, wherein the program is adapted to make a computer perform a method for performing a domain transformation of a digital signal from the time domain into the frequency domain and vice versa, the digital signal being an audio signal, an image signal or a video signal, the computer readable medium comprising:
- code for performing the transformation by a transforming element comprising a plurality of lifting stages, wherein the transformation corresponds to a transformation matrix and wherein at least one lifting stage of the plurality of lifting stages comprises at least one auxiliary transformation matrix and a rounding unit, the auxiliary transformation matrix comprising the transformation matrix itself or the corresponding transformation matrix of lower dimension; and
- code for performing a rounding operation of the signal by the rounding unit after the transformation by the auxiliary transformation matrix.

* * * * *